(12) United States Patent
Ishida

(10) Patent No.: US 9,792,197 B2
(45) Date of Patent: Oct. 17, 2017

(54) APPARATUS AND PROGRAM

(71) Applicants: Shinichi Ishida, Odawara-shi, Kanagawa (JP); Tsutomu Matsuzaki, Inagi-shi, Tokyo (JP); I-SYSTEM CO., LTD., Chiyoda-ku, Tokyo (JP)

(72) Inventor: Shinichi Ishida, Odawara (JP)

(73) Assignees: Shinichi Ishida, Kanagawa (JP); Tsutomu Matsuzaki, Tokyo (JP); I-SYSTEM CO., LTD., Tokyo (JP)

( * ) Notice: Subject to any disclaimer, the term of this patent is extended or adjusted under 35 U.S.C. 154(b) by 0 days.

(21) Appl. No.: 14/905,444

(22) PCT Filed: Aug. 1, 2013

(86) PCT No.: PCT/JP2013/070927
§ 371 (c)(1),
(2) Date: Jan. 15, 2016

(87) PCT Pub. No.: WO2015/015622
PCT Pub. Date: Feb. 5, 2015

(65) Prior Publication Data
US 2016/0162384 A1    Jun. 9, 2016

(51) Int. Cl.
*G06F 9/44* (2006.01)
*G06F 9/45* (2006.01)
*G06F 11/36* (2006.01)

(52) U.S. Cl.
CPC .............. *G06F 11/362* (2013.01); *G06F 8/31* (2013.01); *G06F 8/75* (2013.01); *G06F 8/70* (2013.01)

(58) Field of Classification Search
CPC ...... G06F 11/362–11/3696; G06F 8/31; G06F 8/75; G06F 8/70
See application file for complete search history.

(56) References Cited

U.S. PATENT DOCUMENTS 5,581,756 A * 12/1996 Nakabayashi .... G06F 17/30595
5,838,975 A * 11/1998 Abramson .......... G06F 11/3636
714/E11.208

(Continued)

FOREIGN PATENT DOCUMENTS

JP    2000112747 A    4/2000
JP    2005301859 A    10/2005

(Continued)

OTHER PUBLICATIONS

William N. Sumner, Comparison-based Computation of Causal Paths for Software Failures, 2009, pp. 1-12. https://www.cs.purdue.edu/homes/xyzhang/Comp/tech09.pdf.*

(Continued)

*Primary Examiner* — Thuy Dao
*Assistant Examiner* — Mongbao Nguyen
(74) *Attorney, Agent, or Firm* — Holtz, Holtz & Volek PC

(57) ABSTRACT

This apparatus is provided with a storage device and a CPU. The storage device has two or more modules stored therein. The CPU acquires, from the storage device, a first module and a second module from among the modules stored in the storage device. Furthermore, the CPU creates a message that indicates whether a hierarchical structure of the first module matches a hierarchical structure of the second module.

5 Claims, 14 Drawing Sheets

(56) References Cited

U.S. PATENT DOCUMENTS

| | | | |
|---|---|---|---|
| 8,261,237 B2* | 9/2012 | Zeidman | G06F 8/71 434/118 |
| 9,015,680 B1* | 4/2015 | Shropshire | G06F 11/3624 717/126 |
| 9,128,807 B2 | 9/2015 | Ishida | |
| 2005/0234887 A1 | 10/2005 | Harako | |
| 2006/0004528 A1 | 1/2006 | Uehara et al. | |
| 2007/0094540 A1* | 4/2007 | Kamimura | G06F 8/75 714/38.1 |
| 2008/0295081 A1* | 11/2008 | Albot | G06F 11/3688 717/128 |
| 2008/0320054 A1* | 12/2008 | Howard | G06F 8/51 |
| 2010/0083230 A1* | 4/2010 | Ramakrishnan | G06F 8/71 717/121 |
| 2010/0153923 A1* | 6/2010 | Kawahito | G06F 8/40 717/124 |
| 2010/0275190 A1* | 10/2010 | Ishizaki | G06F 8/458 717/149 |
| 2011/0016457 A1* | 1/2011 | Artzi | G06F 9/4448 717/131 |
| 2011/0167410 A1* | 7/2011 | Huuck | G06F 8/43 717/124 |
| 2011/0296378 A1* | 12/2011 | Chiang | G06F 8/71 717/113 |
| 2012/0185839 A1* | 7/2012 | Nikaido | G06F 8/65 717/168 |
| 2014/0075418 A1* | 3/2014 | Bates | G06F 8/4441 717/129 |
| 2014/0173559 A1* | 6/2014 | Tiwari | G06F 8/31 717/122 |

FOREIGN PATENT DOCUMENTS

| | | |
|---|---|---|
| JP | 2006018693 A | 1/2006 |
| JP | 2009086922 A | 4/2009 |
| JP | 2009176108 A | 8/2009 |
| JP | 2013025716 A | 2/2013 |

OTHER PUBLICATIONS

Michiru Makuuchi, An approach to separating the levels of hierarchical structure building in language and mathematics, 2012, pp. 1-13.*

Gary W. Oehlert, A First Course in Design and Analysis of Experiments, 2010, p. 44 and pp. 88-107.*

International Search Report (ISR) dated Sep. 17, 2013 issued in International Application No. PCT/JP2013/070927.

* cited by examiner 311 (sequence number)
312 (sentence)
361 (sequence number)
362 (hierarchy depth)

310 (line)

| 0001 | ACCEPT A |
| 0002 | ACCEPT B |
| 0003 | ACCEPT C |
| 0004 | ACCEPT D |
| 0005 | IF A=B |
| 0006 | THEN |
| 0007 | EVALUATE B |
| 0008 | WHEN C |
| 0009 | IF C=D |
| 0010 | THEN |
| 0011 | X = 0 |
| 0012 | ELSE |
| 0013 | X = 3 |
| 0014 | END-IF |
| 0015 | WHEN OTHER |
| 0016 | X = 2 |
| 0017 | END-EVALUATE |
| 0018 | ELSE |
| 0019 | X = 1 |
| 0020 | END-IF |

360 (line)

| 0001 | 1 |
| 0002 | 1 |
| 0003 | 1 |
| 0004 | 1 |
| 0005 | ① |
| 0006 | ② |
| 0007 | ② |
| 0008 | ③ |
| 0009 | ③ |
| 0010 | ④ |
| 0011 | 4 |
| 0012 | ④ |
| 0013 | 4 |
| 0014 | ③ |
| 0015 | ③ |
| 0016 | 3 |
| 0017 | ② |
| 0018 | ② |
| 0019 | 2 |
| 0020 | ① |

FIG. 8

36a (1st hierarchical structure)

361 (sequence number)   hierarchy pattern (before compression)   363 (hierarchy pattern (after compression))

360a (line)

| 0005 | 1 2 2 3 3 4 4 3 3 2 2 1 | 1 2 3 4 3 2 1 | 0020 |
| 0007 | 2 3 3 4 4 3 3 2 | 2 3 4 3 2 | 0017 |
| 0009 | 3 4 4 3 | 3 4 3 | 0014 | hierarchy depth   364 (end line)

36a (2nd hierarchical structure)

361 (sequence number)   hierarchy pattern (before compression)   363 (hierarchy pattern (after compression))

360a (line)

| 0004 | 1 2 2 3 3 2 2 1 | 1 2 3 2 1 | 0014 |
| 0006 | 2 3 3 2 | 2 3 2 | 0011 | hierarchy depth   364 (end line)

FIG. 9

| MODULE ID | LINE NUMBER | HIERARCHICAL STRUCTURE | | SEQUENCE NUMBER | SECONDARY SENTENCE |
| | | BRANCH HIERARCHY | HIERARCHY DEPTH | | |
|---|---|---|---|---|---|
| XXX | 1 | 1 | 1 | 002400 | MAIN-S. |
| XXX | 2 | 1 | 1 | 002500 | * |
| XXX | 3 | 1 | 1 | 002600 | *#P    PERFORM  PGMAAAP-PROC. |
| XXX | 4 | 1 | 1 | 006400 | ***************************** |
| XXX | 5 | 1 | 1 | 006500 | *G    CALL AAA PROGRAM |
| XXX | 6 | 1 | 1 | 006600 | *G |
| XXX | 7 | 1 | 1 | 006700 | ***************************** |
| XXX | 8 | 1 | 1 | 006800 | PGMAAAP-PROC. |
| XXX | 9 | 1 | 1 | 006900 | PGMAAAP-SECTION-010. |
| XXX | 10 | 1 | 1 | 007000 | *#C    CALL 'AAA' USING WK-A-I WK-A-O. |
| AAA | 11 | 1 | 1 | 001500 | MAIN-S. |
| AAA | 12 | 1 | 1 | 001600 | * |
| AAA | 13 | 1 | 1 | 001700 |     MOVE WK-A-I    TO WK-C-I. |
| AAA | 14 | 1 | 1 | 001800 | *#C    CALL 'CCC' USING WK-C-I WK-C-O. |
| CCC | 15 | 1 | 1 | 001200 | MAIN-S. |
| CCC | 16 | 1 | 1 | 001300 | * |
| CCC | 17 | 1 | 1 | 001400 |     IF  WK-C-I = 1 |
| CCC | 18 | 1.1 | 1.1 | 001500 |       THEN |
| CCC | 19 | 1.1 | 1.1 | 001600 |         MOVE  1 TO WK-C-O |
| CCC | 20 | 1.2 | 1.1 | 001700 |       ELSE |
| CCC | 21 | 1.2 | 1.1 | 001800 |         IF WK-C-I = 2 |
| CCC | 22 | 1.2.1 | 1.1.1 | 001900 |           THEN |
| CCC | 23 | 1.2.1 | 1.1.1 | 002000 |             COMPUTE WK-C = WK-C-I * 10 |
| CCC | 24 | 1.2.1 | 1.1.1 | 002100 |             MOVE WK-C  TO  WK-C-O |
| CCC | 25 | 1.2.2 | 1.1.1 | 002200 |           ELSE |
| CCC | 26 | 1.2.2 | 1.1.1 | 002300 |             MOVE 9 TO WK-C-I |
| CCC | 27 | 1.2.2 | 1.1.1 | 002400 | *#O          COMPUTE WK-C = |
| CCC | 28 | 1.2.2 | 1.1.1 | 002500 | *#O                   WK-C-I * 5 - 5 |
| CCC | 29 | 1.2.2 | 1.1.1 | T00000 |             COMPUTE WK-C = WK-C-I * 5 - 5 |
| CCC | 30 | 1.2.2 | 1.1.1 | 002600 |             MOVE WK-C  TO  WK-C-O |
| CCC | 31 | 1.2 | 1.1 | 002700 |         END-IF |
| CCC | 32 | 1 | 1 | 002800 |     END-IF. |
| XXX | 43 | 1 | 1 | 002800 | *#E    EVALUATE  WK-A-O |
| XXX | 44 | 1 | 1 | 002900 | *#E      WHEN  CS-1 |
| XXX | 45 | 1 | 1 | W00001 |          IF ( WK-A-O = CS-1 ) |
| XXX | 46 | 1.1 | 1.2 | W00002 |            THEN |
| XXX | 47 | 1.1 | 1.2 | 003000 |              MOVE CS-1    TO  WK-B-I |
| XXX | 48 | 1.2 | 1.2 | W00003 |            ELSE |
| XXX | 49 | 1.2 | 1.2 | 003100 | *#E      WHEN  CS-2 |
| XXX | 50 | 1.2 | 1.2 | W00004 |              IF ( WK-A-O = CS-2 ) |
| XXX | 51 | 1.2.1 | 1.2.1 | W00005 |                THEN |
| XXX | 52 | 1.2.1 | 1.2.1 | 003200 |                  MOVE CS-2    TO  WK-B-I |
| XXX | 53 | 1.2.2 | 1.2.1 | W00006 |                ELSE |
| XXX | 54 | 1.2.2 | 1.2.1 | 003300 | *#E      WHEN  CS-3 |
| XXX | 55 | 1.2.2 | 1.2.1 | W00007 |                  IF ( WK-A-O = CS-3 ) |
| XXX | 56 | 1.2.2.1 | 1.2.1.1 | W00008 |                    THEN |
| XXX | 57 | 1.2.2.1 | 1.2.1.1 | 003400 |                      MOVE CS-3    TO  WK-B-I |
| XXX | 58 | 1.2.2.2 | 1.2.1.1 | W00009 |                    ELSE |
| XXX | 59 | 1.2.2.2 | 1.2.1.1 | 003500 | *#E      WHEN  CS-4 |
| XXX | 60 | 1.2.2.2 | 1.2.1.1 | W00010 |                      IF ( WK-A-O = CS-4 ) |
| XXX | 61 | 1.2.2.2.1 | 1.2.1.1.1 | W00011 |                        THEN |
| XXX | 62 | 1.2.2.2.1 | 1.2.1.1.1 | 003600 |                          MOVE CS-4    TO  WK-B-I |
| XXX | 63 | 1.2.2.2.2 | 1.2.1.1.1 | W00012 |                        ELSE |
| XXX | 64 | 1.2.2.2.2 | 1.2.1.1.1 | 003700 | *#E      WHEN  OTHER |
| XXX | 65 | 1.2.2.2.2 | 1.2.1.1.1 | 003800 |                          MOVE 9      TO  WK-B-I |
| XXX | 66 | 1.2.2.2.2 | 1.2.1.1.1 | 003900 | *#E    END-EVALUATE. |
| XXX | 67 | 1.2.2.2.2 | 1.2.1.1.1 | W00013 |                      END-IF |
| XXX | 68 | 1.2.2 | 1.2.1 | W00014 |                  END-IF |
| XXX | 69 | 1.2 | 1.2 | W00015 |              END-IF |
| XXX | 70 | 1 | 1 | W00016 |          END-IF |

FIG. 12

32 (1st secondary module (before maintenance))

| 321 | 322 | 324 | 325 | 326 | 327 |
|---|---|---|---|---|---|
| XXX | 44 | 1 | 1 | 002900 | *#E    WHEN  CS-1 |
| XXX | 45 | 1 | 1 | W00001 | IF ( WK-A-O = CS-1 ) |
| XXX | 46 | 1.1 | 1.2 | W00002 | THEN |
| XXX | 47 | 1.1 | 1.2 | 003000 | MOVE CS-1    TO  WK-B-I |
| XXX | 48 | 1.2 | 1.2 | W00003 | ELSE |
| XXX | 49 | 1.2 | 1.2 | 003100 | *#E    WHEN  CS-2 |
| XXX | 50 | 1.2 | 1.2 | W00004 | IF ( WK-A-O = CS-2 ) |
| XXX | 51 | 1.2.1 | 1.2.1 | W00005 | THEN |
| XXX | 52 | 1.2.1 | 1.2.1 | 003200 | MOVE CS-2    TO  WK-B-I |
| XXX | 53 | 1.2.2 | 1.2.1 | W00006 | ELSE |
| XXX | 54 | 1.2.2 | 1.2.1 | 003300 | *#E    WHEN  CS-3 |
| XXX | 55 | 1.2.2 | 1.2.1 | W00007 | IF ( WK-A-O = CS-3 ) |
| XXX | 56 | 1.2.2.1 | 1.2.1.1 | W00008 | THEN |
| XXX | 57 | 1.2.2.1 | 1.2.1.1 | 003400 | MOVE CS-3    TO  WK-B-I |
| XXX | 58 | 1.2.2.2 | 1.2.1.1 | W00009 | ELSE |
| XXX | 59 | 1.2.2.2 | 1.2.1.1 | 003500 | *#E    WHEN  CS-4 |
| XXX | 60 | 1.2.2.2 | 1.2.1.1 | W00010 | IF ( WK-A-O = CS-4 ) |
| XXX | 61 | 1.2.2.2.1 | 1.2.1.1.1 | W00011 | THEN |
| XXX | 62 | 1.2.2.2.1 | 1.2.1.1.1 | 003600 | MOVE CS-4    TO  WK-B-I |
| XXX | 63 | 1.2.2.2.2 | 1.2.1.1.1 | W00012 | ELSE |
| XXX | 64 | 1.2.2.2.2 | 1.2.1.1.1 | 003700 | *#E    WHEN  OTHER |
| XXX | 65 | 1.2.2.2.2 | 1.2.1.1.1 | 003800 | MOVE 9    TO  WK-B-I |
| XXX | 66 | 1.2.2.2.2 | 1.2.1.1.1 | 003900 | *#E    END-EVALUATE. |
| XXX | 67 | 1.2.2.2.2 | 1.2.1.1.1 | W00013 | END-IF |
| XXX | 68 | 1.2.2 | 1.2.1 | W00014 | END-IF |
| XXX | 69 | 1.2 | 1.2 | W00015 | END-IF |
| XXX | 70 | 1 | 1 | W00016 | END-IF |

32 (2nd secondary module (after maintenance))

| 321 | 322 | 324 | 325 | 326 | 327 |
|---|---|---|---|---|---|
| XXX | 43 | 1 | 1 | 002800 | *#E    EVALUATE  WK-A-O |
| XXX | 44 | 1 | 1 | 002900 | *#E    WHEN  CS-1 |
| XXX | 45 | 1 | 1 | W00001 | IF ( WK-A-O = CS-1 ) |
| XXX | 46 | 1.1 | 1.2 | W00002 | THEN |
| XXX | 47 | 1.1 | 1.2 | 003000 | MOVE CS-1    TO  WK-B-I |
| XXX | 48 | 1.2 | 1.2 | W00003 | ELSE |
| XXX | 49 | 1.2 | 1.2 | 003100 | *#E    WHEN  CS-2 |
| XXX | 50 | 1.2 | 1.2 | W00004 | IF ( WK-A-O = CS-2 ) |
| XXX | 51 | 1.2.1 | 1.2.1 | W00005 | THEN |
| XXX | 52 | 1.2.1 | 1.2.1 | 003200 | MOVE CS-2    TO  WK-B-I |
| XXX | 53 | 1.2.2 | 1.2.1 | W00006 | ELSE |
| XXX | 54 | 1.2.2 | 1.2.1 | 003300 | *#E    WHEN  CS-3 |
| XXX | 55 | 1.2.2 | 1.2.1 | W00007 | IF ( WK-A-O = CS-3 ) |
| XXX | 56 | 1.2.2.1 | 1.2.1.1 | W00008 | THEN |
| XXX | 57 | 1.2.2.1 | 1.2.1.1 | 003400 | MOVE CS-3    TO  WK-B-I |
| XXX | 58 | 1.2.2.2 | 1.2.1.1 | W00009 | ELSE |
| XXX | 59 | 1.2.2.2 | 1.2.1.1 | 003700 | *#E    WHEN  OTHER |
| XXX | 60 | 1.2.2.2 | 1.2.1.1 | 003800 | MOVE 9    TO  WK-B-I |
| XXX | 61 | 1.2.2.2 | 1.2.1.1 | 003900 | *#E    END-EVALUATE. |
| XXX | 62 | 1.2.2 | 1.2.1 | W00010 | END-IF |
| XXX | 63 | 1.2 | 1.2 | W00011 | END-IF |
| XXX | 64 | 1 | 1 | W00012 | END-IF |

FIG. 17

APPARATUS AND PROGRAM

TECHNICAL FIELD

This invention relates to an apparatus which compares two modules (source programs) each including one or more sentences written in a programming language.

BACKGROUND ART

In general, a program tends to be used for a long time while being repeatedly maintained. In many cases, program maintenance is performed to change function of a program. In addition, a program is sometimes maintained so as to be adapted to replacement of an environment in which the program is used, wherein the environment is, for example, a hardware that is a platform of the program, an operating system (OS) or a middleware. Moreover, a program is sometimes maintained so as to be adapted to replacement of a programming language describing the program. Thus, such maintenance that is not intended to change function of a program (hereafter, such maintenance is referred to as "conversion") is sometimes carried out.

When such conversion of a program is required, every sentence of the program needs to be examined whether some change is necessary or not, and subsequently, modification should be applied only to the sentences necessary to be changed. However, there are many systems each of which includes programs whose total sum of sentences is over one million. It is not easy in such a system to correctly carry out the conversion. Moreover, it is not easy to verify whether the conversion is correctly carried out or not. Moreover, not limited to the conversion, and regardless of the size of a system, it is not easy to verify whether a program maintenance is correctly carried out or not.

In order to verify whether a program maintenance is correctly carried out or not, there is a general technique of comparing programs before and after maintenance to find out parts different from each other. For example, Patent Document 1 discloses a program difference detecting apparatus which compares token arrangements generated from respective programs before and after maintenance to find out different parts of the respective programs before and after maintenance. The tokens of Patent Document 1 include reserved words, character constants, etc. According to Patent Document 1, since the program difference detecting apparatus finds out different parts of respective programs with use of the arrangement of such tokens, the program difference detecting apparatus can find out the different parts not based on syntactic difference such as difference in starting column of a sentence but based on semantic difference.

PRIOR ART DOCUMENTS

Patent Document(s)

Patent Document 1: JP A 2009-176108

SUMMARY OF INVENTION

Technical Problem

However, for example, in a case where a programming language is replaced, the reserved words (i.e. tokens) of the programming language are usually changed. Moreover, in a case where a program is changed in order to be adapted to replacement of an OS or a middleware, function names (i.e. tokens) written in the program are sometimes changed. When the technique disclosed in Patent Document 1 is used in such cases, semantically same parts are found out to be different parts. Thus, the technique disclosed in Patent Document 1 is hard to be used in a conversion.

It is therefore an object of the present invention to provide an apparatus which compares two modules each including one or more sentences written in a programming language and which compares the two modules by using a new method applicable even in a conversion.

Solution to Problem

An aspect of the present invention provides an apparatus which compares two modules each including one or more sentences written in a programming language. The module is capable of including conditional statements written therein, wherein each of the conditional statements is one of the sentences. The conditional statement includes an executable-on-satisfaction statement and/or an executable-on-failure statement. The executable-on-satisfaction statement is the sentence that is executed when a conditional expression of the conditional statement is satisfied. The executable-on-failure statement is the sentence that is executed when the conditional expression is not satisfied. At least one of the conditional statements is capable of including the other conditional statement therein as the executable-on-satisfaction statement and/or as the executable-on-failure statement so that the conditional statements enable a hierarchization of the sentences. Moreover, the hierarchization of the sentences forms a specifiable hierarchical structure of the module. The apparatus comprises a storage means and a comparing means. The storage means stores two or more of the modules. The comparing means obtains a first module and a second module, from the storage means, among the modules stored in the storage means. The comparing means creates a message which shows whether the hierarchical structure of the first module is identical to the hierarchical structure of the second module or not.

Another aspect of the present invention provides a program which makes a computer function as the apparatus.

Advantageous Effects of Invention

According to the present invention, the created message shows whether the hierarchical structures of the two modules are identical to each other or not. When the hierarchical structures of the two modules are not identical to each other, the two modules are very likely to include the respective parts semantically different from each other. The message can therefore notify whether the two modules include the respective parts semantically different from each other.

An appreciation of the objectives of the present invention and a more complete understanding of its structure may be had by studying the following description of the preferred embodiment and by referring to the accompanying drawings.

BRIEF DESCRIPTION OF DRAWINGS

FIG. 8 is a diagram showing a modified example of the first module shown in FIG. 6 and the hierarchical structure of the modified example.

FIG. 9 is a diagram showing modified examples of the respective hierarchical structures of FIGS. 6 and 7.

FIG. 12 is a diagram schematically showing data configuration of a secondary module stored in the storage device of FIG. 10.

FIG. 17 is a diagram showing examples of two respective modules (first module and second module) of the secondary modules stored in the storage device of FIG. 10.

DESCRIPTION OF EMBODIMENTS

Figure 1:
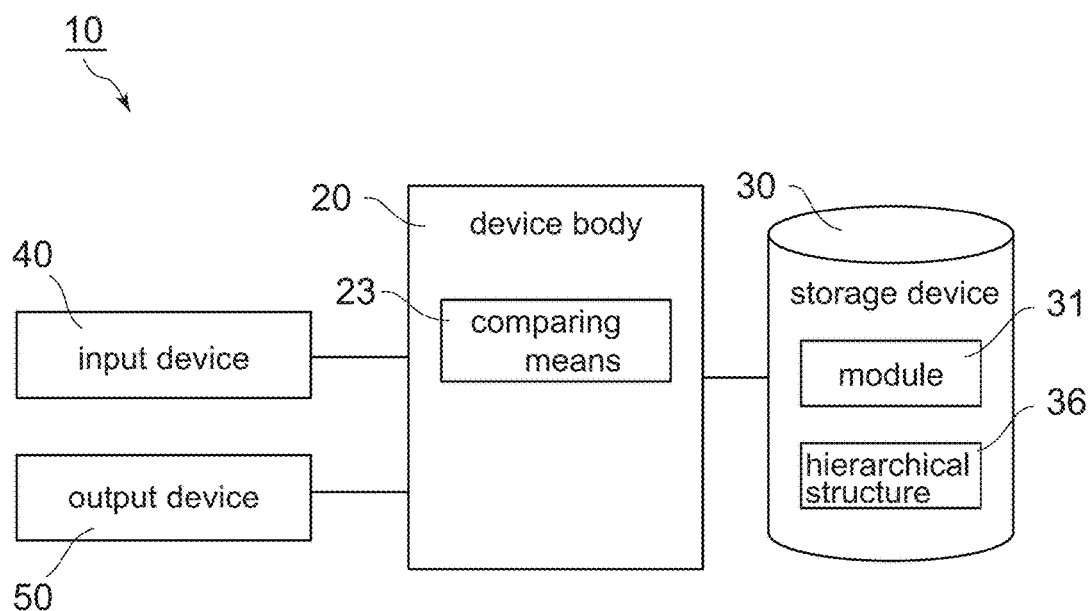
FIG. 1 is a block diagram showing a comparing apparatus (apparatus) according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

First Embodiment

As shown in FIG. 1, a comparing apparatus (apparatus) 10 according to a first embodiment of the present invention comprises a device body 20, a storage device (storage means) 30, an input device 40 and an output device 50. The comparing apparatus 10 is to compare two modules (source programs) each including one or more sentences written in a programming language.

The program language according to the present embodiment is COBOL. However, the present invention is also applicable for a program language other than COBOL.

The module according to the present embodiment can be identified by a module name which is formed of combined letters, digits, symbols, etc.

The module is capable of including one or more of processing sections written therein, wherein each of the processing sections includes one or more of the sentences. The processing section according to the present embodiment is a section in COBOL. Each of the sections can be identified by a section name (processing section name). However, the processing section does not need to be the section. For example, when the program language is JAVA (trademark), the processing section may be a function which can be identified by a function name (processing section name).

The module can call the other modules or the module itself. Moreover, the section of the module can perform the other sections or the section itself. More specifically, the module is capable of including each of a processing-section perform statement (the sentence) and a module call statement (the other sentence) written therein, wherein the processing-section perform statement is to perform the section identified by the section name, and the module call statement is to perform one of the modules identified by the module name. According to the present embodiment, the processing-section perform statement is PERFORM-statement, and the module call statement is CALL-statement. In another program language, each of the processing-section perform statement and the module call statement is, for example, a statement which specifies the function name. In a case where the module call statement is the statement specifying the function name, the specified function of the module (i.e. a part of the module) is executed by the module call statement. In this case, the module name may not be explicitly written in the module call statement. In other words, the module name may be indirectly specified by the function name.

Moreover, the module is capable of including conditional statements written therein, wherein each of the conditional statements is one of the sentences. The conditional statement includes a conditional expression, and an executable-on-satisfaction statement and/or an executable-on-failure statement can be written in the conditional statement. In other words, the conditional statement is capable of including the executable-on-satisfaction statement and/or the executable-on-failure statement. The executable-on-satisfaction statement is the sentence that is executed when the conditional expression of the conditional statement is satisfied. The executable-on-failure statement is the sentence that is executed when the conditional expression is not satisfied. The conditional statement according to the present embodiment is IF-statement or EVALUATE-statement. In IF-statement, the executable-on-satisfaction statement is the sentence written subordinate to THEN-phrase, and the executable-on-failure statement is the sentence written subordinate to ELSE-phrase. Similarly, in EVALUATE-statement, the executable-on-satisfaction statement is the sentence written subordinate to WHEN-phrase.

At least one of the conditional statements according to the present embodiment is capable of including the other conditional statement therein as the executable-on-satisfaction statement and/or as the executable-on-failure statement so that the conditional statements enable a hierarchization of the sentences. For example, IF-statement can be written as the executable-on-satisfaction statement of the other IF-statement. In other words, the module is composed of one or more of the sentences which can be nested with the conditional statements, so that the module has a predetermined hierarchical structure (i.e. the hierarchical structure formed by the conditional statements). As can be seen easily, the hierarchical structure of the module formed by the hierarchization can be specified by analyzing the sentences of the module.

As shown in FIG. 1, the storage device 30 is a magnetic disk unit, for example. The storage device 30 can store various files which are hierarchized, for example, with folders (not shown). The storage device 30 is communicatively coupled to the device body 20, and can read (obtain) and write (store) the file in accordance with an instruction from the device body 20. The storage device 30 according to the present embodiment stores two or more of modules 31. In addition, the storage device 30 can store hierarchical structures 36.

The module 31 is created by using a programming tool (not shown), for example. Each of the modules 31 may be a single file. Alternatively, a plurality of the modules 31 may be stored as a single file. The hierarchical structure 36 is to store the hierarchical structure of the module 31. According to the present embodiment, the hierarchical structures 36 are created for the respective modules 31.

The input device 40 is a keyboard or a mouse, for example. The input device 40 is communicatively coupled to the device body 20, and can send a character input from the keyboard or a position indicated by the mouse to the device body 20.

The output device 50 is a display or a printer, for example. The output device 50 is communicatively coupled to the device body 20, and can display or print data (for example, a character or a figure) transmitted from the device body 20.

The device body 20 is a main body of a personal computer (PC), for example. The device body 20 has a central processing unit (CPU), a primary storage device, etc. (not shown). The storage device 30 stores executable files of various programs (not shown). The CPU loads the executable files into the primary storage device to perform various functions by executing instructions in each of the executable files. During a process in which the CPU executes the instructions, a predetermined file stored in the storage device 30 is read into a variable region of the program via a buffer area in the primary storage device. The content of the file read into the variable region of the program is written into the storage device 30 via the buffer area of the primary storage device as necessary. As can be seen from the above explanation, each of the storage device 30 and the primary storage device functions as a readable and writable storage means in the present embodiment. In other words, the storage means according to the present embodiment may be one of the storage device 30 and the primary storage device, or may be both of them. In the following explanation, the storage device 30 is used as the storage means.

The storage device 30 according to the present embodiment stores various programs such as a comparing program (not shown). The aforementioned programs are loaded into the primary storage device and executed by the CPU so that the computer functions as various means (i.e. as apparatus). For example, the comparing program makes the computer function as a comparing means 23 (comparing apparatus 10) that compares a first module 31 and a second module 31 among the modules 31 stored in the storage device 30. In other words, the device body 20 of the apparatus 10 according to the present embodiment comprises the comparing means 23.

Figure 2:
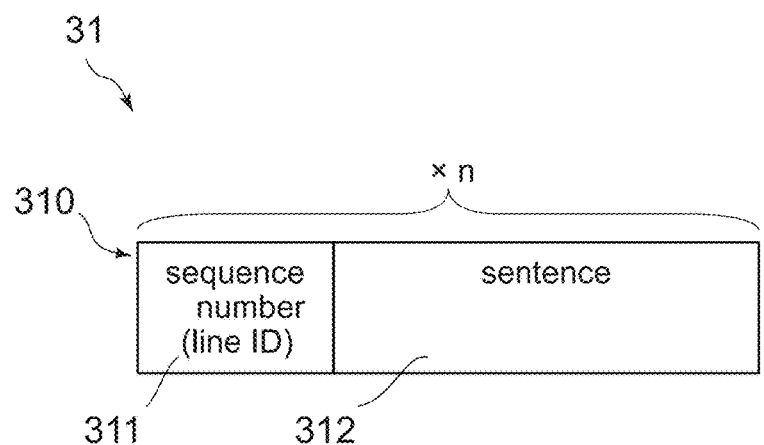
FIG. 2 is a diagram schematically showing data configuration of a module stored in a storage device of the apparatus of FIG. 1.

As shown in FIG. 2, the module 31 according to the present embodiment is composed of n (n≥1) lines 310. The module 31 according to the present embodiment is a text file. However, the module 31 may be a worksheet of MICROSOFT EXCEL (trademark), for example. In a case where the module 31 is the worksheet, the comparing means 23 can be implemented in an EXCEL macro, for example. The line 310 according to the present embodiment is formed of a sequence number (line ID) 311 and a sentence 312. The sequence number 311 is to identify the line 310 and to judge the order of the lines 310. The sequence number 311 may include characters or symbols as well as digits. The sentence 312 includes the statement (for example, a data definition statement, an executable statement or a comment statement) written therein. The sentence 312 may include a complete single statement wholly written therein. Alternatively, the sentence 312 may include a part of the single statement. For example, MOVE-statement may be separately written in the sentences 312 of the two lines 310.

Figure 3:
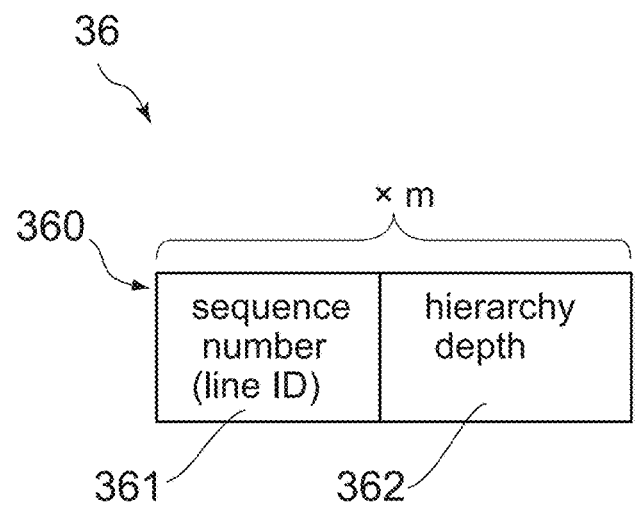
FIG. 3 is a diagram schematically showing data configuration of a hierarchical structure stored in the storage device of FIG. 1.

As shown in FIG. 3, the hierarchical structure 36 according to the present embodiment is composed of m (m≥1) lines 360. The hierarchical structure 36 according to the present embodiment is a worksheet of MICROSOFT EXCEL (trademark). However, the hierarchical structure 36 may be a text file, for example. The hierarchical structure 36 is created via an analysis of the hierarchical structure of the module 31 made by the comparing means 23 and is stored in association with the module 31. Specifically, for example, the hierarchical structure 36 has a file name same as a file name of the corresponding module 31. Alternatively, the module 31 and the hierarchical structure 36 corresponding to each other may be respective worksheets of a common workbook.

The line 360 according to the present embodiment is formed of a sequence number (line ID) 361 and a hierarchy depth 362. The sequence number 361 is set to the sequence number 311 of the corresponding line 310 of the corresponding module 31. The hierarchy depth 362 is set to a hierarchy depth of the sentence 312 which corresponds to the sequence number 361 (i.e. sequence number 311). In other words, the hierarchical structure 36 includes the hierarchy depth 362 which is specified in the hierarchization of the sentences 312.

Figure 6:
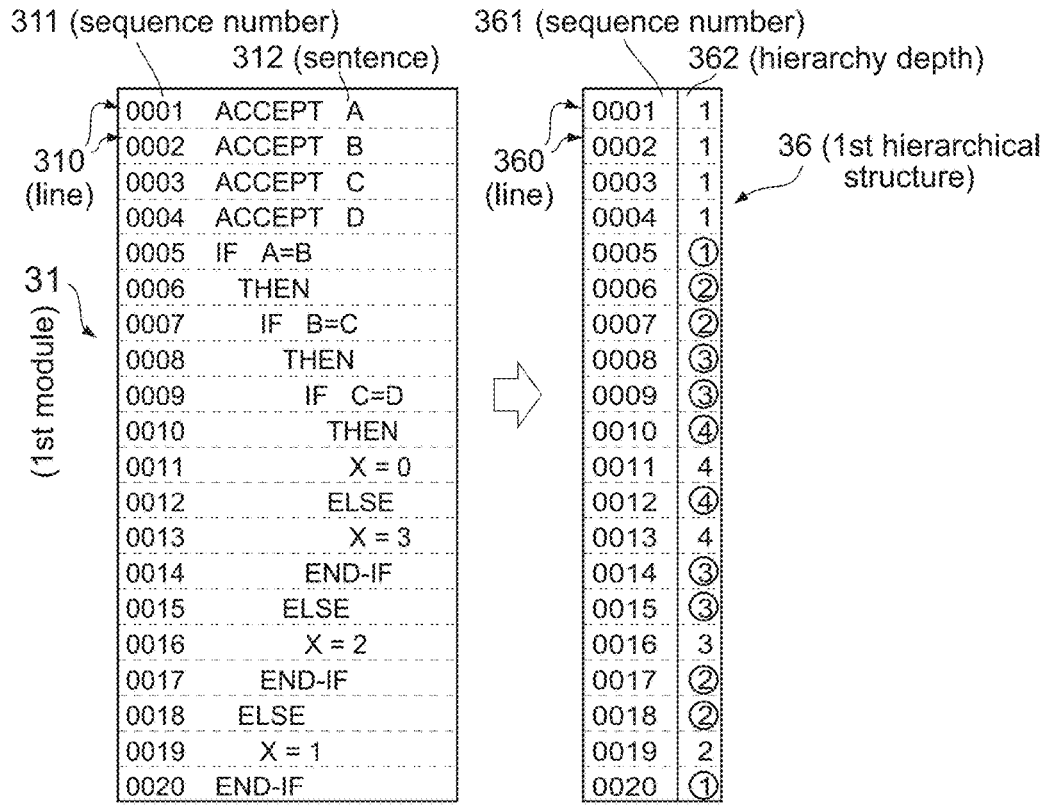
FIG. 6 is a diagram showing an example of a module (first module) stored in the storage device of FIG. 1 and the hierarchical structure of the exemplified first module.

For example, referring to an example module 31 shown in FIG. 6, each of the sentences 312 between ACCEPT-statement with the sequence number 311 of "0001" and ACCEPT-statement with the sequence number 311 of "0004" has the hierarchy depth of 1. In addition, IF-statement with the sequence number 311 of "0005" has the hierarchy depth of 1. THEN with the sequence number 311 of "0006" has the hierarchy depth of 2. As can be seen from the above explanation, the top sentence 312 of the module 31 has the hierarchy depth of 1. As the sentences 312 are sequentially picked up, the hierarchy depth 362 is incremented by 1 each time when THEN is found. Moreover, as can be seen from the hierarchy depth 362 of each of the sentences 312 with the sequence numbers 311 of "0014", "0017" and "0020", the hierarchy depth 362 is decremented by 1 each time when END-IF is found.

As described above, according to the present embodiment, the hierarchy depth 362 is set to a numerical value. However, the hierarchy depth 362 is not required to be set to a numerical value, provided that the hierarchy depths in the hierarchical structure can be compared with one another. Moreover, it is sufficient if the hierarchy depth 362 is designed to be changed in value upon the detection of THEN and to recover the value before the change upon the detection of corresponding END-IF. The hierarchy depth may be applied only to the lines each including the executable statement written therein. Moreover, the hierarchy depth may be applied only to the top line and the end line of IF-statement as well as the lines each including THEN or ELSE written therein.

Figure 5:
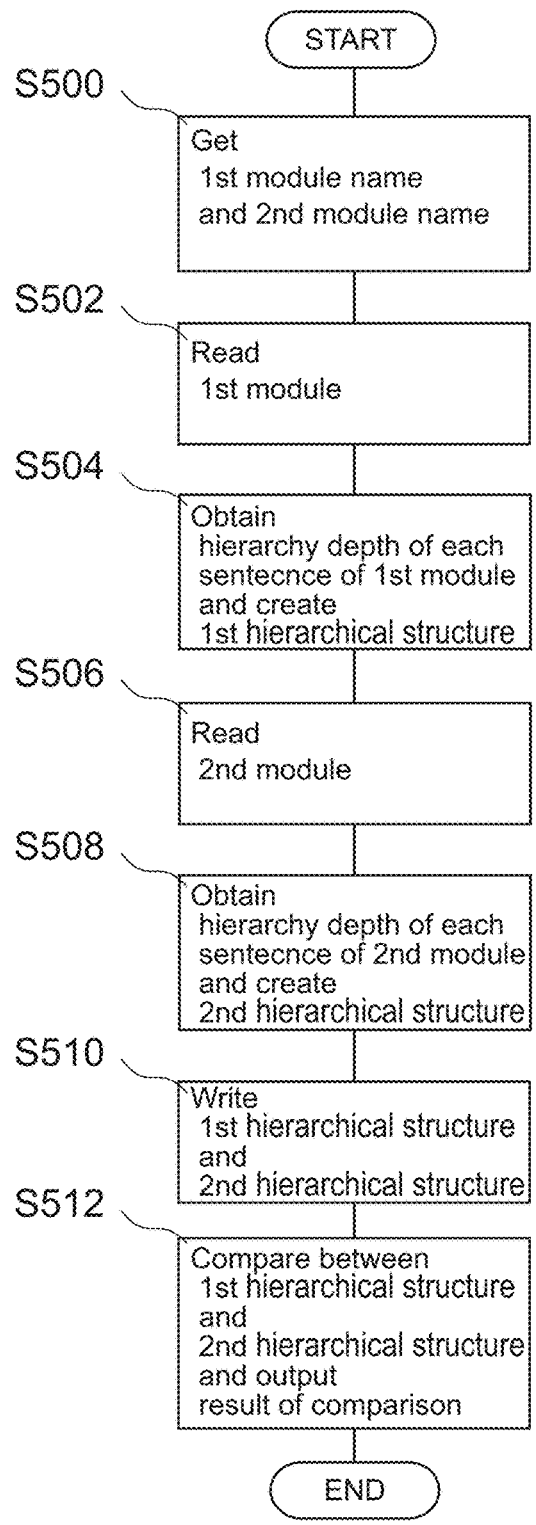
FIG. 5 is a flowchart showing functions of a comparing means of the apparatus of FIG. 1.
Figure 7:
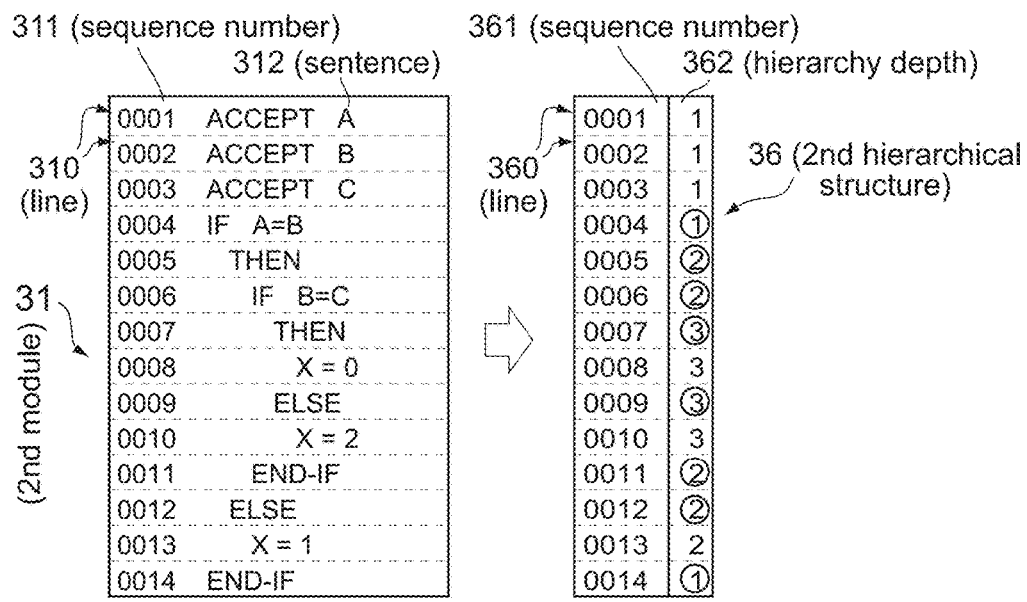
FIG. 7 is a diagram showing an example of another module (second module) stored in the storage device of FIG. 1 and the hierarchical structure of the exemplified second module.

Hereafter, by using FIG. 5 while referring to examples shown in FIGS. 6 to 8, explanation is made in detail about the function and the process of the apparatus 10 according to the present embodiment. First, explanation is made about an example in which the module 31 includes only IF-statement as the conditional statement (see FIGS. 6 and 7). Then, explanation is made about another example in which the module 31 includes the conditional statement other than IF-statement (see FIG. 8).

As shown in FIG. 5, the comparing means 23 according to the present embodiment is activated, for example, by a start instruction input from the input device 40, and subsequently, gets a first module name to identify the first module 31 and a second module name to identify the second module 31 (S500). For example, the second module 31 is the maintained first module 31. Each of the first module name and the second module name may be input, for example, as a part of the start instruction.

Then, the comparing means 23 reads the first module 31, which is identified by the obtained first module name, from the storage device 30 (S502). At that time, for example, only one of the modules 31 stored in a predetermined folder may be the target to be read. If the first module 31 is not stored in the storage device 30, the comparing means 23 ends its process (not shown).

Then, the comparing means 23 generates the hierarchy depth for each sentence 312 of the first module 31 and creates a first hierarchical structure 36 (S504). Specifically, the comparing means 23 sequentially retrieves the lines 310 of the first module 31 from the first line to the last line while applying the hierarchy depth to each of the lines 310. At that time, the comparing means 23 adjusts the hierarchy depth of the first line to 1 and increments the hierarchy depth each time when THEN of IF-statement is found. Moreover, the comparing means 23 decrements the hierarchy depth each time when END-IF of IF-statement (i.e. the end of IF-statement) is found. In a case where the description of THEN or END-IF can be omitted, the hierarchy depth can be set by analyzing, for example, the order of the statements in IF-statement. The comparing means 23 combines the sequence numbers 311 of the lines 310 with the hierarchy depths generated as described above to create the hierarchical structure 36.

Referring to the example shown in FIG. 6, the comparing means 23 applies the hierarchy depth 362 for each of the sentences 312 between the top executable statement of the first module 31 (i.e. the sentence 312 with the sequence number 311 of "0001") and the last executable statement (i.e. the sentence 312 with the sequence number 311 of "0020"). The comparing means 23 combines the sequence numbers 311 with the hierarchy depths 362 to create the first hierarchical structure 36.

Then, as shown in FIG. 5, the comparing means 23 reads the second module 31 that is identified by the obtained second module name from the storage device 30 similar to the first module 31 (S506).

Then, the comparing means 23 generates the hierarchy depth for each sentence 312 of the second module 31 and creates a second hierarchical structure 36 similar to the first module 31 (S508).

Referring to the example shown in FIG. 7, the comparing means 23 applies the hierarchy depth 362 for each of the sentences 312 between the top executable statement of the second module 31 (i.e. the sentence 312 with the sequence number 311 of "0001") and the last executable statement (i.e. the sentence 312 with the sequence number 311 of "0014"). The comparing means 23 combines the sequence numbers 311 with the hierarchy depths 362 to create the second hierarchical structure 36.

As shown in FIG. 5, the comparing means 23 according to the present embodiment writes the first hierarchical structure 36 and the second hierarchical structure 36, which are thus-created, into the storage device 30 (S510). However, the first hierarchical structure 36 and the second hierarchical structure 36 may be stored only into the primary storage device (not shown) of the device body 20. In other words, the hierarchical structures 36 may be stored not in the storage device 30 but in the primary storage device (not shown).

Then, the comparing means 23 compares between the first hierarchical structure 36 and the second hierarchical structure 36 (S512). For example, the comparing means 23 sequentially compares the hierarchy depths 362 of the first hierarchical structure 36 with the hierarchy depths 362 of the second hierarchical structure 36 from the first line and determines whether the fluctuations of the hierarchy depths 362 are identical to each other or not.

Referring to the examples, namely, the first hierarchical structure 36 and the second hierarchical structure 36, shown in FIGS. 6 and 7, the hierarchy depths 362 in the first hierarchical structure 36 (see FIG. 6) fluctuates in the order of 1, 2, 3, 4, 3, 2, 1 except the parts with no fluctuation. On the other hand, the hierarchy depths 362 in the second hierarchical structure 36 (see FIG. 7) fluctuates in the order of 1, 2, 3, 2, 1 except the parts with no fluctuation. Thus, the fluctuation of the hierarchy depths 362 of the first hierarchical structure 36 is not identical to the fluctuation of the hierarchy depths 362 of the second hierarchical structure 36. In this case, the comparing means 23 creates a message which shows that the first hierarchical structure 36 of the first module 31 is not identical to the second hierarchical structure 36 of the second module 31. In contrast, in a supposed case where the hierarchy depths 362 in the second hierarchical structure 36 fluctuates in the order of 1, 2, 3, 4, 3, 2, 1, the fluctuation of the hierarchy depths 362 of the first hierarchical structure 36 is identical to the fluctuation of the hierarchy depths 362 of the second hierarchical structure 36. In this case, the comparing means 23 creates another message which shows that the first hierarchical structure 36 of the first module 31 is identical to the second hierarchical structure 36 of the second module 31.

As described above, the comparing means 23 creates the message, or the result of the comparison between the first hierarchical structure 36 and the second hierarchical structure 36 (S512 of FIG. 5). The comparing means 23 according to the present embodiment outputs the created message to the output device 50 (S512).

The first hierarchical structure 36 and the second hierarchical structure 36 may be compared with each other by a method other than that of the present embodiment. For example, as can be seen from FIGS. 6 and 7, the sequence numbers 361 and the hierarchy depths 362 may be created only from IF-statement, THEN, ELSE and END-IF (see the parts whose hierarchy depths 362 are encircled in FIGS. 6 and 7). In this case, the first hierarchical structure 36 and the second hierarchical structure 36 can be compared with each other by sequentially comparing the hierarchy depths 362 of the first hierarchical structure 36 with the hierarchy depths 362 of the second hierarchical structure 36 from the first line.

Moreover, as can be seen from FIG. 8, at least one of the first module 31 and the second module 31 may include the conditional statement other than IF-statement. For example, in a case where EVALUATE-statement is included, the comparing means 23 may update the hierarchy depth when first WHEN of EVALUATE-statement is found and may set back the hierarchy depth prior to the updating when END-EVALUATE corresponding to EVALUATE-statement is found. The conditional statement other than IF-statement and EVALUATE-statement can be similarly processed. As can be seen easily, after the hierarchical structures 36 (the first hierarchical structure 36 and the second hierarchical structure 36) are created, the function and the process of the comparing means 23 are same as those in the case where the module 31 includes only IF-statement as the conditional statement.

As previously described, the comparing means 23 according to the present embodiment creates the message not only when the first hierarchical structure 36 is not identical to the second hierarchical structure 36 but also when the first hierarchical structure 36 is identical to the second hierarchical structure 36. However, the comparing means 23 may create the message in only one of two cases, namely, a case where the first hierarchical structure 36 is not identical to the second hierarchical structure 36 and another case where the first hierarchical structure 36 is identical to the second hierarchical structure 36. Moreover, the message created by the comparing means 23 may shows not only whether the first hierarchical structure 36 of the first module 31 is identical to the second hierarchical structure 36 of the second module 31 or not, but also the different parts between the first hierarchical structure 36 and the second hierarchical structure 36. As explained below, in this case, the comparing means 23 may create a hierarchical structure 36*a* (see FIG. 4) instead of the hierarchical structure 36.

Figure 4:
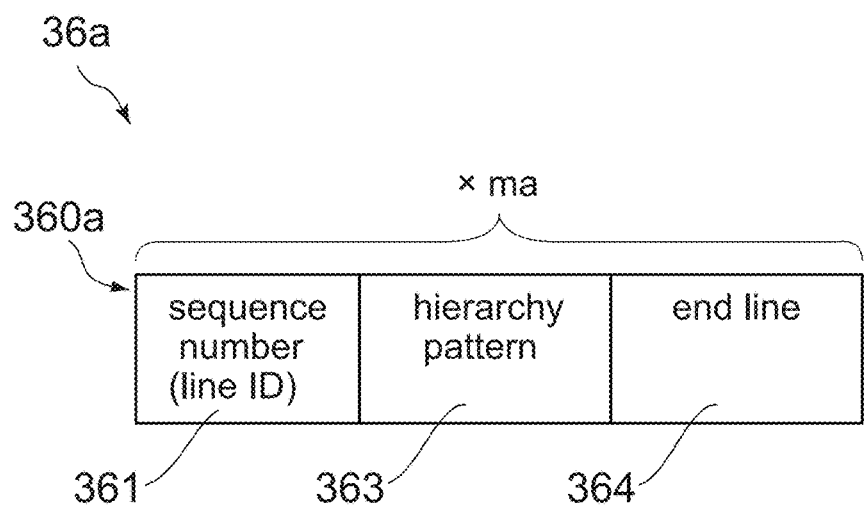
FIG. 4 is a diagram showing a modification of the data configuration of FIG. 3.

As shown in FIG. 4, the hierarchical structure 36*a* is composed of ma (ma≥1) lines 360*a*. Similar to the hierarchical structure 36, the hierarchical structure 36*a* is created via an analysis of the hierarchical structure of the module 31 made by the comparing means 23 and is stored in association with the module 31.

The lines 360*a* of the hierarchical structure 36*a* are created so as to correspond to the respective conditional statements of the corresponding module 31. For example, referring to the example of FIG. 6, the conditional statements (IF-statements) of the first module 31 are written in the three lines 310 with the sequence numbers 311 of "0005", "0007" and "0009". Accordingly, as shown in the upper part of FIG. 9, the hierarchical structure 36*a* of the first module 31 includes the three lines 360*a*. On the other hand, referring to the example of FIG. 7, the conditional statements (IF-statements) of the second module 31 are written in the two lines 310 with the sequence numbers 311 of "0004" and "0006". Accordingly, as shown in the lower part of FIG. 9, the hierarchical structure 36*a* of the second module 31 includes the two lines 360*a*.

As shown in FIG. 4, the line 360*a* is formed of the sequence number (line ID) 361, a hierarchy pattern 363 and an end line (sequence number) 364. The sequence number 361 is set to the sequence number 311 of the corresponding module 31. The end line 364 is set to the sequence number 311 of the end line of the conditional statement written in the line 310 of the sequence number 361 (sequence number 311), for example, the sequence number 311 of the line 310 in which END-IF corresponding to IF-statement is written. As explained below, the hierarchy pattern 363 is set to data which can identify the hierarchical structure of the range between the sequence number 361 and the end line 364.

For example, referring to the example in FIG. 6 and the example in the upper part of FIG. 9, first IF-statement, which is written in the line 310 with the sequence number 311 of "0005", ends at the line 310 with the sequence number 311 of "0020". Accordingly, the sequence number 361 and the end line 364 of the first line of a first hierarchical structure 36*a* are set to "0005" and "0020", respectively. At that time, the comparing means 23 creates a hierarchy pattern before compression ("1 2 2 3 3 4 4 3 3 2 2 1") by combining the hierarchy depths of IF-statements, THENs, ELSEs and END-IFs written between the line 310 with the sequence number 311 of "0005" and the line 310 with the sequence number 311 of "0020". Then, the comparing means 23 creates the hierarchy pattern 363 after compression ("1 2 3 4 3 2 1") by compressing the successive same hierarchy depths in the hierarchy pattern before compression into a single hierarchy depth. The comparing means 23 similarly creates the hierarchy pattern 363 after compression for each of If-statement written in the line 310 with the sequence number 311 of "0007" and If-statement written in the line 310 with the sequence number 311 of "0009". As can be seen from the above explanation, the comparing means 23 generates the sequence number 361, the end line 364 and the hierarchy pattern 363 for each of the conditional statements of the first module 31, and creates the first hierarchical structure 36*a* (see S504 of FIG. 5).

Similarly, as can be seen from the example in FIG. 7 and the example in the lower part of FIG. 9, the comparing means 23 generates the sequence number 361, the end line 364 and the hierarchy pattern 363 for each of the conditional statements of the second module 31, and creates a second hierarchical structure 36*a* (see S508 of FIG. 5).

The comparing means 23 according to the present modification compares between the first hierarchical structure 36*a* and the second hierarchical structure 36*a* which are created as described above, and outputs the result of the comparison (S512 of FIG. 5). For example, the comparing means 23 sequentially compares the hierarchy patterns 363 of the first hierarchical structure 36*a* with the hierarchy patterns 363 of the second hierarchical structure 36*a*. At that time, the comparing means 23 may compare only the hierarchy patterns 363, each of which has the starting hierarchy depth of 1, with each other. For example, referring to the examples in FIG. 9, the hierarchy pattern 363 with the sequence number 361 of "0005" in the first hierarchical structure 36*a* may be compared with the hierarchy pattern 363 with the sequence number 361 of "0004" in the second hierarchical structure 36*a*.

According to the modification described above, when the hierarchy patterns 363 of the first hierarchical structure 36*a* (i.e. the first module 31) are not identical to the hierarchy patterns 363 of the second hierarchical structure 36*a* (i.e. the second module 31), it is possible to output the inequal parts to the output device 50 together with the message which shows the inequality. Specifically, for example, the sequence number 311 and the end line 364 for each of the hierarchy patterns 363, which are not identical to each other, may be output to the output device 50.

The comparing means 23 may compares not only the hierarchy patterns 363 each of which has the starting hierarchy depth of 1 but also all of the hierarchy patterns 363. In this case, the inequal parts between the first module 31 and the second module 31 can be limited to a narrower range.

As described above, the comparing means 23 according to the present embodiment (including the modifications) outputs the message to the output device 50. However, the comparing means 23 may store the message into the storage means 30 as well as output it to the output device 50. Moreover, the comparing means 23 may store the message into the storage means 30 without outputting it to the output device 50. Moreover, the comparing means 23 may send the message to the other devices or means.

The comparing means 23 according to the present embodiment can be variously modified as described below in addition to the aforementioned modifications.

For example, at least one of the first module 31 and the second module 31 may be a combination of a plurality of the modules 31. For example, a plurality of the modules 31 may be simply and sequentially combined from each start line to its end line to form the first module 31 or the second module 31. Thereby, the whole of a single program formed of a plurality of the modules 31 can be compared at one time. It is also possible to combine a plurality of the modules 31 according to a second embodiment as described below.

Second Embodiment

Figure 10:
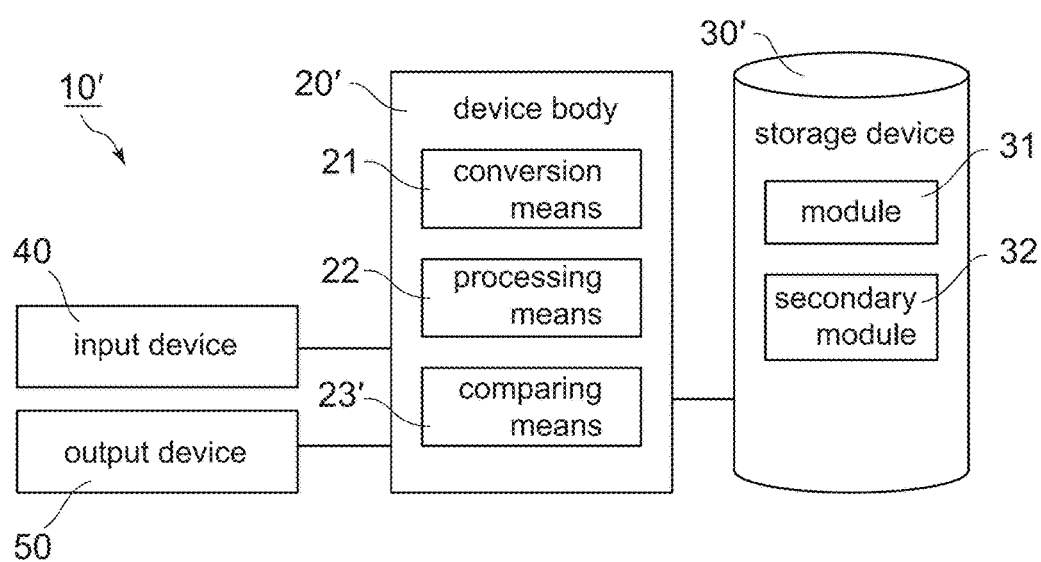
FIG. 10 is a block diagram showing a comparing apparatus (apparatus) according to a second embodiment of the present invention.

As shown in FIG. 10, a comparing apparatus (apparatus) 10' according to a second embodiment of the present invention comprises a device body 20', a storage device (storage means) 30', the input device 40 and the output device 50. Similar to the apparatus 10 according to the first embodiment, the apparatus 10' is to compare two modules (source programs) each including one or more sentences written in a programming language. The program language, the module, the input device 40 and the output device 50 according to the second embodiment are configured similar to those of the first embodiment.

As shown in FIG. 10, the storage device 30' is a magnetic disk unit similar to the storage device 30. The storage device 30' stores two or more of the modules 31 similar to the first embodiment. In addition, the storage device 30' stores two or more of secondary modules (modules) 32. The secondary module 32 according to the present embodiment is created by converting one of the modules 31 or created by combining and converting two or more of the modules 31.

The device body 20' is, for example, a main body of a PC similar to the device body 20. The device body 20' has a CPU, a primary storage device, etc. (not shown). Similar to the first embodiment, each of the storage device 30' and the primary storage device functions as a readable and writable storage means in the present embodiment. In the following explanation, the storage device 30' is used as an example of the storage means.

The storage device 30' according to the present embodiment stores a conversion program, a processing program and a comparing program (not shown). The aforementioned programs are loaded into the primary storage device and executed by the CPU so that the computer functions as each of a conversion means 21, a processing means 22 and a comparing means 23'. Thus, the aforementioned programs are to make the computer function as the apparatus 10' that compares two modules each including one or more sentences written in a programming language. In other words, the device body 20' of the apparatus 10' according to the present embodiment comprises the conversion means 21, the processing means 22 and the comparing means 23'.

The conversion means 21 according to the present embodiment is to convert a predetermined module 31 among the modules 31 stored in the storage device 30' into the secondary module 32 to store it into the storage device 30'. The processing means 22 is to process the secondary module 32 (a first module 32 and/or a second module 32) stored in the storage device 30'. The comparing means 23' is to compare the first module 32 and the second module 32 stored in the storage device 30' similar to the comparing means 23 of the first embodiment. However, the comparing means 23' according to the present embodiment does not compare the two module 31 but compares the two secondary modules 32 (the first module 32 and the second module 32 which are created from the two respective modules 31.

Figure 11:
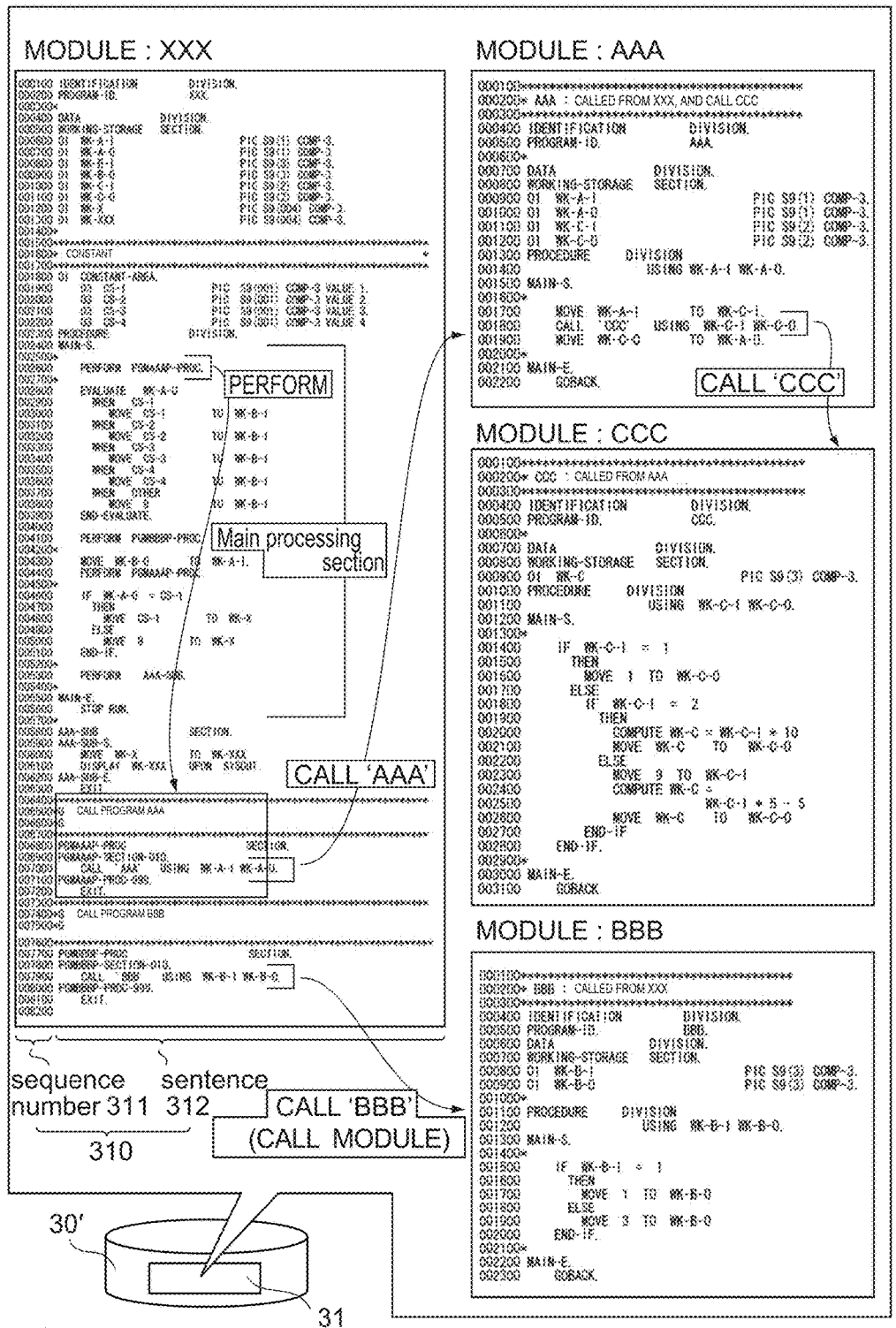
FIG. 11 is a diagram showing an example set of modules stored in a storage device of FIG. 10.

As shown in FIG. 11, the storage device 30' stores, for example, a module 31 (XXX module) having a module name of XXX, another module 31 (AAA module) having another module name of AAA, another module 31 (BBB Module) having another module name of BBB and another module 31 (CCC module) having another module name of CCC. Each of the modules 31 is composed of a plurality of the lines 310 each of which is formed of the sequence number 311 and the sentence 312. Hereafter, more specific explanation about the structure of the module 31 is made as referring to these examples.

XXX module is a main module (i.e. a module where a process starts). XXX module has the lines 310 in which respective CALL-statements for identifying and calling AAA module and BBB module by using their module names are written. AAA module has the line 310 in which CALL-statement for calling CCC module is written.

Each of the example modules 31 illustrated in FIG. 11 includes one or more of the sections. For example, XXX module has a main section (i.e. a main processing section where a process of the module starts) and sub-sections (subordinate processing sections). The main section is composed of the lines 310 between the line 310 next to the line 310 in which "PROCEDURE DIVISION." is written and the line 310 in which "STOP RUN." is written. One of the subordinate processing sections (sub-sections) is composed of the lines 310 between the line 310 in which "AAA-SUB SECTION." is written and the line 310 in which "EXIT." is written. The aforementioned sub-section has the section name (processing section name) of AAA-SUB. The main section includes the line 310 which identifies and performs AAA-SUB section by using its section name. More specifically, the main section includes the line 310 in which "PERFORM AAA-SUB." is written.

Some of example sections illustrated in FIG. 11 include the lines 310 in each of which the conditional statement is written. For example, the main section of XXX module includes the lines 310 in which EVALUATE-statement having five WHEN phrases are written and the lines 310 in which IF-statement having THEN and ELSE are written. The main section of CCC module includes the lines 310 in which IF-statement having ELSE including the other IF-statement is written so that the conditional statements form hierarchies of the sentences 312.

As shown in FIG. 12, the secondary module 32 according to the present embodiment is composed of a plurality of secondary lines (lines) 320. The secondary module 32 according to the present embodiment is a worksheet of MICROSOFT EXCEL (trademark). However, the secondary module 32 may be a text file, for example. The line 320 according to the present embodiment is formed of a module ID 321, a line number 322, a hierarchical structure 323, a sequence number (line ID) 326 and a secondary sentence 327.

Each of the secondary modules 32 is generated by collecting the lines 310 from one or more of the modules 31 and processing the collected lines 310 in which the executable statements, etc. are written. The secondary module 32 according to the present embodiment is generated by the conversion means 21 and processed by the processing means 22. The processed secondary modules 32 are compared with each other by the comparing means 23'.

As shown in FIG. 12, an example of the secondary module 32 according to the present embodiment is generated by collecting and processing the lines 310 in PROCEDURE DIVISIONs of XXX module, AAA module, BBB module and CCC module.

As can be seen from FIGS. 11 and 12, each PERFORM-statement written in the sentence 312 of the line 310 (for example, "PERFORM PGMAAAP-PROC" in FIG. 11) is commented out in the secondary sentence 327 of the line 320. In contrast, the sentences 312 in PGMAAAP-PROC section, which is to be performed by this PERFORM-statement, are expanded into the secondary sentences 327 of the lines 320. Moreover, each CALL-statement written in the sentence 312 of the line 310 is commented out, or changed into a comment statement, in the secondary sentence 327 of the line 320. In contrast, the sentences 312 in PROCEDURE DIVISION of AAA module, which is to be called by CALL-statement, are expanded into the secondary sentences 327 of the lines 320, or expanded so that the secondary sentences 327 of the lines 320 are generated. In addition, the sentences 312 in PROCEDURE DIVISION of CCC module, which is to be called by CALL-statement of AAA module, are expanded into the secondary sentences 327 of lines 320.

Regarding the conditional statements written in the sentences 312, the conditional statement other than IF-statement, or EVALUATE-statement in the present embodiment, is converted into IF-statements in the secondary sentences 327. For example, the three sentences 312 in which "EVALUATE WK-A-O", "WHEN CS-1" and "MOVE CS-1 TO WK-B-I" are written, respectively, are converted into the five secondary sentences 327 in which "*# E EVALUATE WK-A-O" (comment statement), "*# E WHEN CS-1" (comment statement), "IF (WK-A-O=CS-1)", "THEN" and "MOVE CS-1 TO WK-B-I" are written, respectively (see the part enclosed by dashed line A in FIG. 12). According to the present embodiment, in addition to the aforementioned conversion, the secondary sentences 327 are generated to supplement the lack of THEN, ELSE and END-IF in IF-statement. Moreover, a negative conditional expression is converted into an affirmative conditional expression. Moreover, IF-statement having conditional expressions coupled with each other by AND or OR is broken down into a plurality of IF-statements, or converted into IF-statements each having a simple secondary conditional expression which evaluates the relation of two operands only by a single logical operator. However, some of the aforementioned conversions (for example, the breakdown of the conditional expressions coupled with each other by AND or OR) does not necessarily need to be done.

In addition, each executable statement, for example, MOVE-statement, which is separately written in a plurality of the sentences 312 is arranged into a single secondary sentence 327. Thus, each of the lines 320 of the secondary module 32 is generated based on the line 310 of the module 31. More specifically, the secondary sentence 327 is either a copy of the sentence 312 with no modification or a sentence generated by processing and/or expanding the sentence 312.

The module ID 321 according to the present embodiment is to indicate the module 31 from which the corresponding line 320 is generated. More specifically, the module ID 321 is set to the module name, for example, XXX. However, a number, etc. which can uniquely identify the module 31 may be set instead of the module name.

In a case where the line 320 has the secondary sentence 327 copied from the sentence 312, the sequence number 326 thereof is set to the sequence number 311 of the copied source line 310. In other words, when the line 320 one-to-one corresponds to the line 310, for example, when the line 320 includes the secondary sentence 327 generated by commenting out the sentence 312, the sequence number 326 is set to the sequence number 311 of the corresponding line 310. On the other hand, the sequence number 326 in the generated (added) line 320 is set to an identifier, for example, a combination of symbols, which can indicate that the line 320 is generated. By doing so, the line 320 and the line 310 can be easily associated with each other.

The line number 322 according to the present embodiment is set to a serial number which starts from 1 and is incremented along the order of the lines 320. However, the line number 322 does not need to be a serial number, provided that the line numbers 322 can be compared with one another in magnitude relation. For example, the line number 322 may be a combination of characters and symbols.

The hierarchical structure 323 according to the present embodiment is formed of a branch hierarchy 324 and a hierarchy depth 325. The branch hierarchy 324 is used to specify a hierarchy formed with the conditional statements. The branch hierarchy 324 according to the present embodiment is set in such a manner that 1 is used as the starting value of the first line 320. In other words, the branch hierarchy 324 of the first line 320 is 1. The branch hierarchy 324 is changed into 1.1 at the line 320 in which THEN of IF-statement is written while being changed into 1.2 at the line 320 in which ELSE is written. The branch hierarchy 324 returns to 1 from the line next to the line 320 in which END-IF of IF-statement is written. When generalized: at the line 320 in which THEN is written, "0.1" is appended to the end of the branch hierarchy 324 of the immediately preceding line 320; at the line 320 in which ELSE is written, "0.1" of the end of the branch hierarchy 324 of the immediately preceding line 320 is changed into "0.2"; and at the line 320 next to the line 320 in which END-IF is written, "0.2" of the end of the branch hierarchy 324 of the line 320 in which END-IF is written is removed. Except for the above cases, the branch hierarchy 324 is set to a value same as that of the immediately preceding line 320.

Similar to the branch hierarchy 324, the hierarchy depth 325 according to the present embodiment is set in such a manner that 1 is used as the starting value at the first line 320. In other words, the hierarchy depth 325 of the first line 320 is 1. The hierarchy depth 325 is changed into 1.1 at the line 320 in which THEN of IF-statement is written while returning to 1 from the line 320 next to the line 320 in which END-IF is written. Thereafter, the hierarchy depth 325 is changed into 1.2 at the line 320 in which THEN of IF-statement is written while returning to 1 from the line 320 next to the line 320 in which END-IF is written. When generalized: the hierarchy depth 325 has the starting value of 1; at the line 320 in which THEN is written, a digit of ".q" (q is an integer equal to or more than 1) is appended to its end; and at the line 320 next to the line 320 in which END-IF is written, its end digit of ".q" is removed. The value of q in ".q" starts from 1 for each digit. In detail, the value of q in ".q" of the first digit (for example, "0.2" of 1.2) starts from 1 and is incremented each time when being appended. The value of q in ".q" of the second digit or the digit after the second digit (for example, "0.1" of 1.2.1) starts from 1 in a continuous range and is incremented each time when being appended in this continuous range, wherein the continuous range is composed of successive lines 320 having the same hierarchy depth 325 as one another except this digit.

The line 320 may include various items in addition to the items described above. For example, when the line 320 includes the section name of the corresponding line 310, correspondence between the line 320 and the line 310 can be understood more easily.

Hereafter, explanation is made in detail about the function and the process of the apparatus 10' according to the present embodiment.

Figure 13:
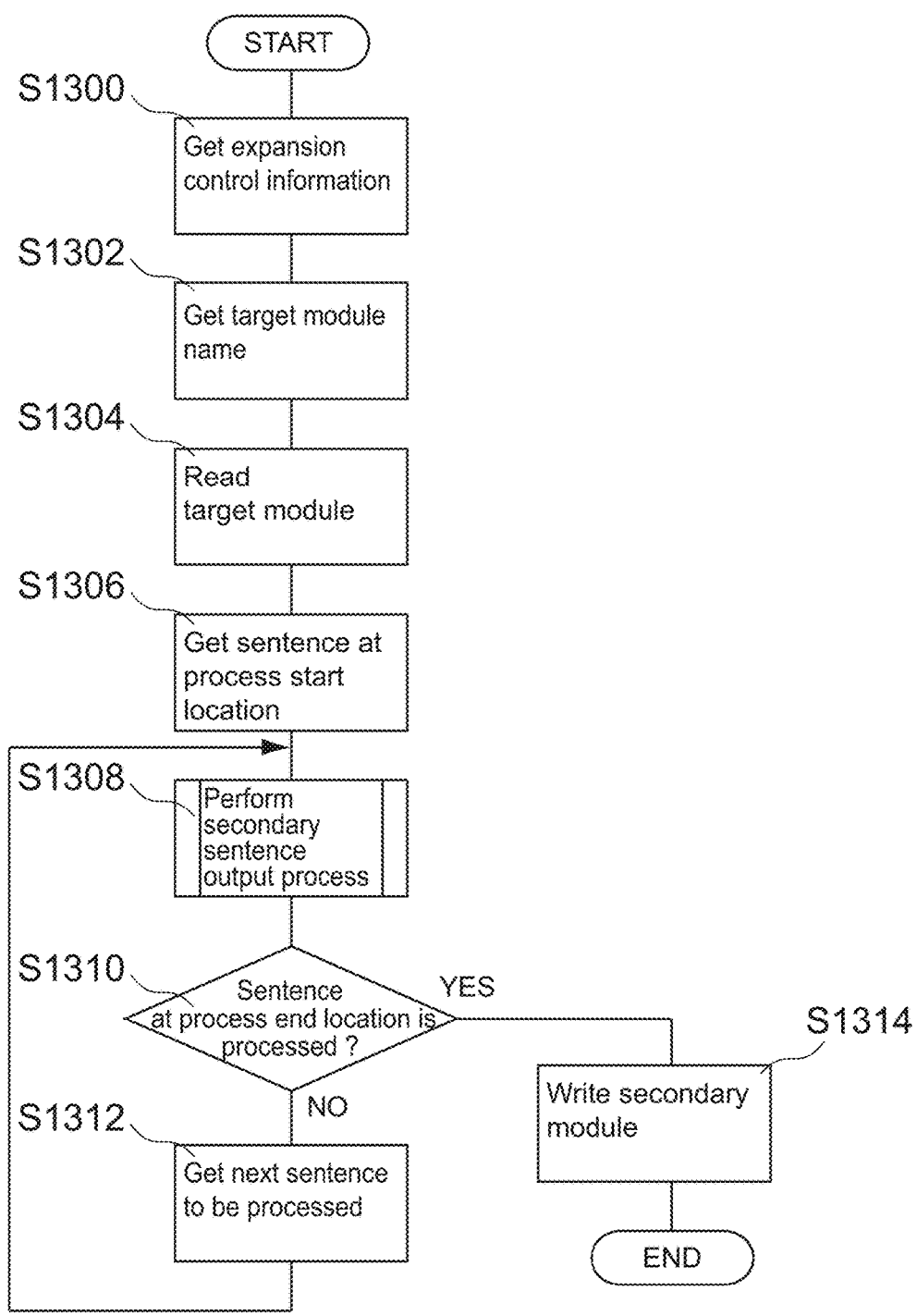
FIG. 13 is a flowchart showing functions of a conversion means of the apparatus of FIG. 10.

As can be seen from FIG. 13, the conversion means 21 according to the present embodiment has a control information getting function (S1300), a read function (S1302 and S1304), a conversion function (S1306 to S1312) and a write function (S1314). The control information getting function is a function to get an expansion control information. The read function is a function to read a target module 31 to be processed among the modules 31 from the storage device 30'. The conversion function is a function to convert the target module 31 into the secondary module 32. The write function is a function to store the secondary module 32 into the storage device 30'.

More specifically, as shown in FIG. 13, when the conversion means 21 is activated, for example, by a start instruction input from the input device 40, the conversion means 21 gets the expansion control information which is, for example, input as a part of the start instruction (S1300). The expansion control information according to the present embodiment can optionally include an expansion limit indicator. The expansion limit indicator indicates that an expansion of the statements written in the sentences 312 of each of the processing section to be performed and the module 31 to be called is limited only once at first time.

Then, the conversion means 21 gets a target module name which identifies the target module 31 (S1302). The target module name can be obtained similar to the expansion control information. The conversion means 21 reads the target module 31 that is identified by the obtained target module name from the storage device 30' (S1304). At that time, for example, the aforementioned target to be read may be limited to the module 31 stored in a predetermined folder. If the target module 31 is not stored in the storage device 30', the conversion means 21 ends its process (not shown).

Then, the conversion means 21 gets the sentence 312 at a process start location of the target module 31 (S1306). The process start location according to the present embodiment is the top of the main section. The conversion means 21 performs a secondary sentence output process for the obtained sentence 312 (S1308). Then, the conversion means 21 determines whether the sentence 312 at a process end location is already processed (S1310). The process end location according to the present embodiment is the end of the main section. If already processed (YES at S1310), the conversion means 21 writes the generated secondary module 32 into the storage device 30' (S1314) and ends its process. On the other hand, if not yet processed (NO at S1310), the conversion means 21 gets the sentence 312 to be processed next, or the sentence 312 of the next line 310 (S1312), and performs the secondary sentence output process for the obtained sentence 312 (S1308).

Figure 14:
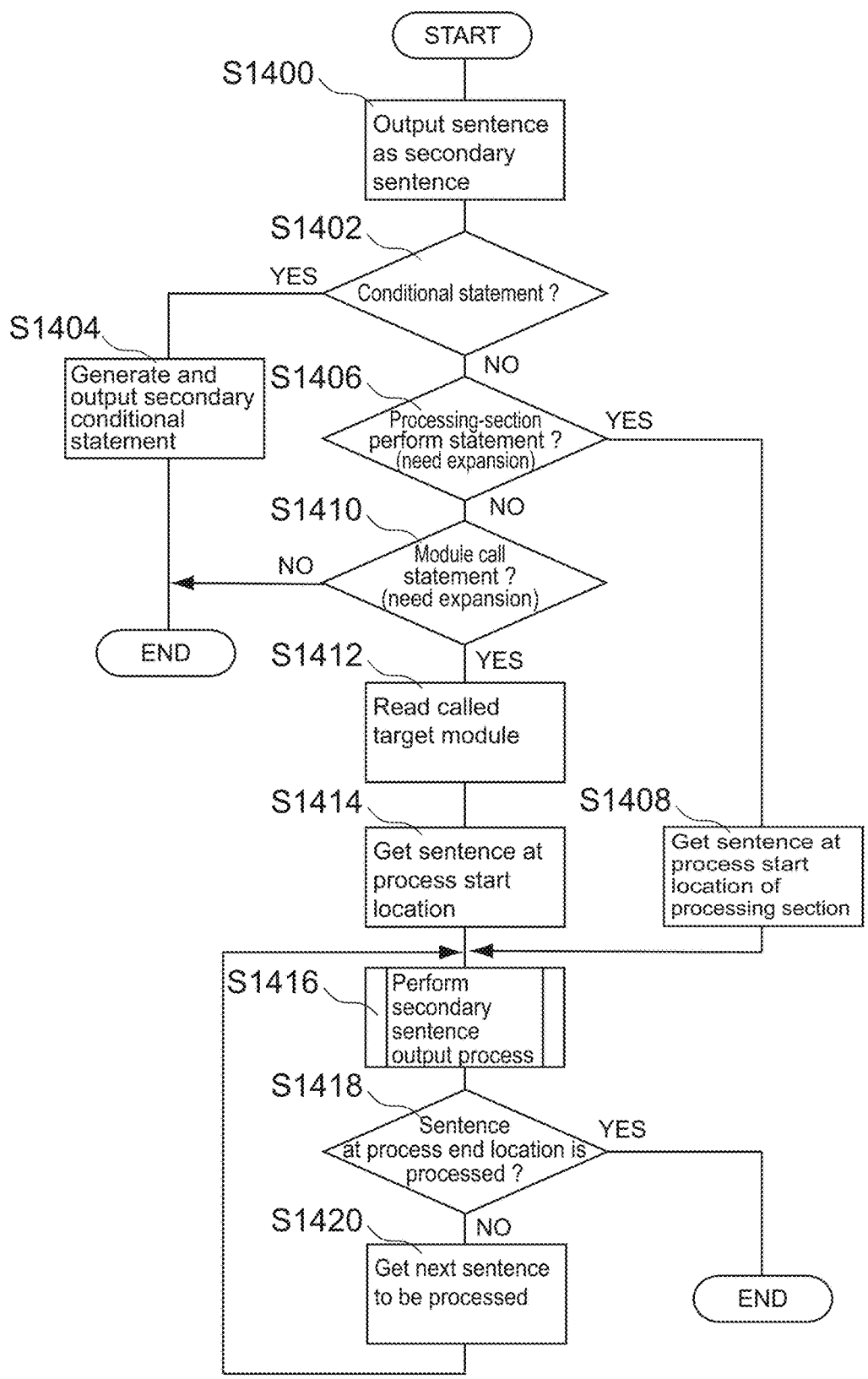
FIG. 14 is a flowchart showing, in further detail, a part of the functions of the conversion means of FIG. 13.

FIG. 14 is a flowchart showing in more detail the secondary sentence output process (S1308) among the processes (functions) of the conversion means 21 shown in FIG. 13. As shown in FIG. 14, in the secondary sentence output process, the conversion means 21 outputs the sentence 312 as the secondary sentence 327 (S1400). More specifically, according to the present embodiment, the executable statement, etc. written in the sentence 312 is copied into a predetermined row and column of a worksheet. At that time, as previously described, the processing such as the commenting out of PERFORM-statement is done. In addition, the conversion means 21 sets the module ID 321, the line number 322 and the sequence number 326 to the previously described values.

Then, the conversion means 21 determines whether the conditional statement is written in the sentence 312 (S1402). If the executable statement written in the sentence 312 is the conditional statement (YES at S1402), the conversion means 21 performs the previously described process so that, for example, the conditional statement other than IF-statement is converted into IF-statement. More specifically, the conversion means 21 generates, based on the conditional expression of the conditional statement, the secondary sentences 327 including the secondary conditional statement (IF-statement) which is one of the secondary statements while hierarchizing the secondary sentences 327 with the secondary conditional statement, outputs the secondary sentences 327 into the secondary module (S1404) and ends its secondary sentence output process.

If the executable statement written in the sentence 312 (target statement) is not the conditional statement (NO at S1402), the conversion means 21 determines whether the target statement is the processing-section perform statement (PERFORM-statement) or not (S1406). If the target statement is the processing-section perform statement (YES at S1406), the conversion means 21 gets the sentence 312 at a process start location of the processing section to be performed. In the present embodiment, the process start location of the processing section is the top of the section.

If the target statement is not the processing-section perform statement (NO at S1406), the conversion means 21 determines whether the target statement is the module call statement (according to the present embodiment, CALL-statement) or not (S1410). If the target statement is the module call statement (YES at S1410), the conversion means 21 reads the called target module 31 that is identified by CALL-statement from the storage device 30' (S1412) and gets the sentence 312 at a process start location of the called target module 31 (S1414). According to the present embodiment, the process start location of the called target module 31 is the top of the main section of this module 31. If the target statement is not the module call statement (NO at S1410), the conversion means 21 ends its secondary sentence output process.

The conversion means 21 recursively performs the secondary sentence output process for the sentence 312 of the section to be performed or for the sentence 312 of the called target module 31 (S1416). Then, the conversion means 21 determines whether the sentence 312 at a process end location is already processed (S1418). The process end location according to the present embodiment is either the end of the section to be performed or the end of the main section of the called target module 31. If already processed (YES at S1418), the conversion means 21 ends its secondary sentence output process. On the other hand, if not yet processed (NO at S1418), the conversion means 21 gets the next sentence 312 to be processed, or the sentence 312 of the next line 310 (S1420) and recursively performs the secondary sentence output process for the obtained sentence 312 (S1416).

The conversion means 21 does not perform the expansion of the sentences 312 of the section which is recursively performed by PERFORM-statement (which performs itself). Similarly, the conversion means 21 does not perform the expansion of the sentences 312 of the module which is recursively called by CALL-statement (which calls itself).

Moreover, in a case where the expansion limit indicator is included in the expansion control information, the conversion means 21 does not perform the secondary sentence output process when the conversion means 21 gets PERFORM-statement that performs the section of the section name same as that of the section for which the secondary sentence output process is already done (S1406). Similarly, in the case where the expansion limit indicator is included in the expansion control information, the conversion means 21 does not perform the secondary sentence output process when the conversion means 21 gets CALL-statement that calls the module 31 of the module name same as that of the module 31 for which the secondary sentence output process is already done (S1410).

As can be seen from the above explanation, the conversion function of the conversion means 21 sequentially outputs each of the sentences 312 written between the predetermined process start location and the predetermined process end location of the target module 31 into the secondary module as the secondary sentence 327. Moreover, when the sentence 312 is the processing-section perform statement or the module call statement, the conversion function of the conversion means 21 generates the secondary sentences 327 to output them into the secondary module 32, wherein the secondary sentences 327 are generated from the sentences 312 which are written in the processing section to be performed or in the called target module 31. Moreover, the conversion function of the conversion means 21 further expands (i.e. recursively expands) the processing-section perform statement and the module call statement in the expansion of the sentences 312. Accordingly, a function distributed in many processing sections and modules 31 can be collected in such a manner that the distributed function is hauled into the main section of the target module 31. In other words, functions of a program can be collected into a single secondary module 32.

As can be seen from the above explanation, when the expansion limit indicator is included in the expansion control information, the conversion function of the conversion means 21 according to the present embodiment generates the expansion of the sentences 312 written in the processing section to be performed only once at first time for the same processing section (i.e. expands the same processing section only once), and generates the expansion of the sentences 312 written in the called target module 31 only once at first time for the same module (i.e. expands the same module 31 only once). However, the conversion function of the conversion means 21 may expand the same processing section or the same module 31 only once when the expansion limit indicator is not included. Moreover, the conversion function of the conversion means 21 may expand the same processing section or the same module 31 only once regardless of whether the expansion limit indicator is included or not. Moreover, the conversion function of the conversion means 21 may repeatedly expand the same processing section or the same module 31 regardless of whether the expansion limit indicator is included or not.

As explained above, the secondary module 32 composed of the secondary sentences 327 is stored into the storage device 30' by the conversion means 21.

Figure 15:
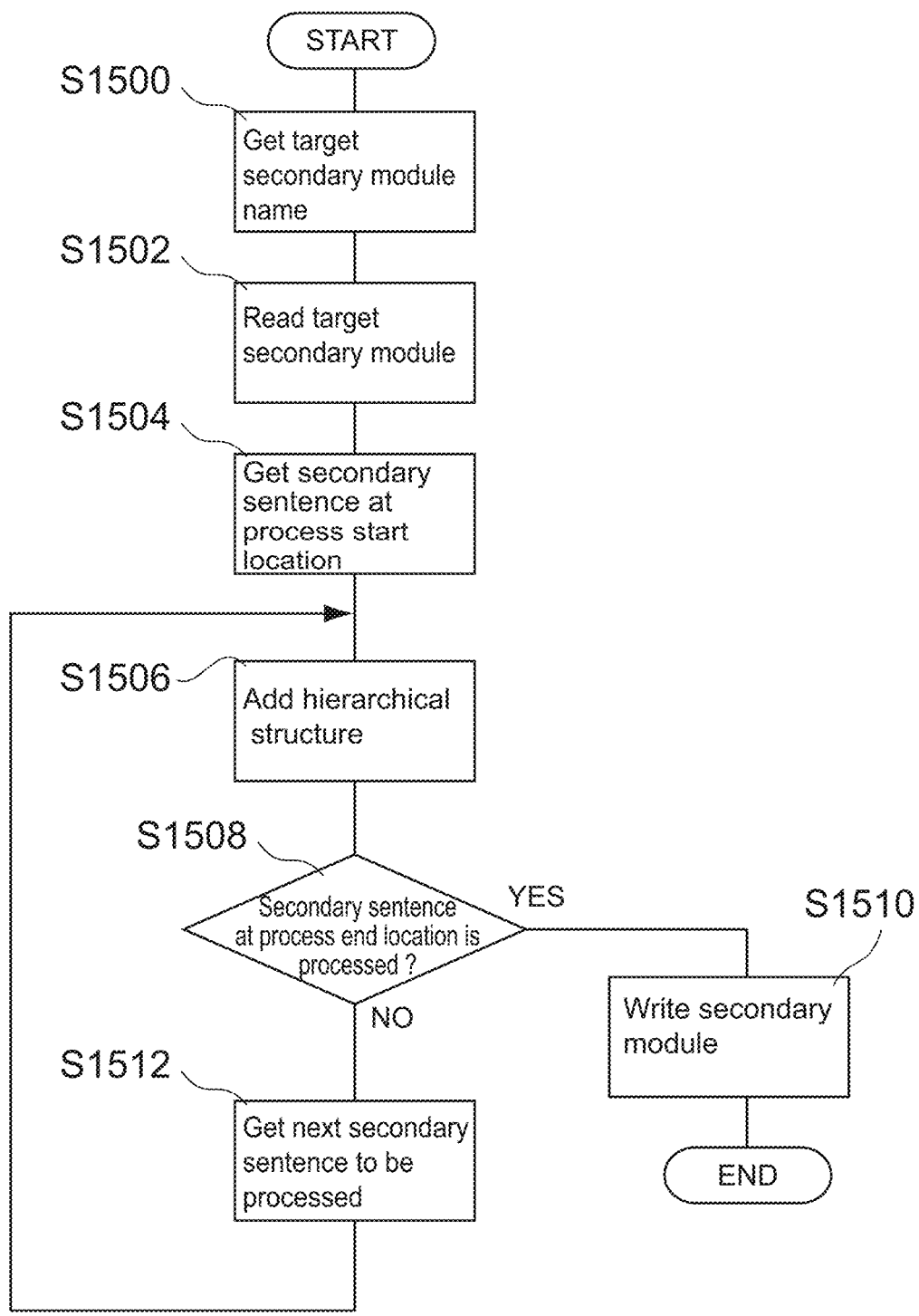
FIG. 15 is a flowchart showing functions of a processing means of the apparatus of FIG. 10.

As can be seen from FIG. 15, the processing means 22 according to the present embodiment has a read function (S1500 and S1502), a hierarchical structure adding function (S1506) and a write function (S1510). The read function is a function to read a target secondary module 32 from the storage device 30'. The hierarchical structure adding function is a function to add the hierarchical structure 323 for at least one of the secondary sentences 327 of the secondary module 32. The write function is a function to store the secondary module 32 into the storage device 30', wherein the secondary module 32 includes the secondary sentence 327 to which the hierarchical structure 323 is added.

More specifically, as shown in FIG. 15, when the processing means 22 is activated, for example, similar to the conversion means 21, the processing means 22 gets a secondary module name which identifies the target secondary module 32 (S1500). The processing means 22 reads the secondary module 32 that is identified by the obtained target secondary module name from the storage device 30' (S1502). If the target secondary module 32 is not stored in the storage device 30', the processing means 22 ends its process (not shown).

Then, the processing means 22 gets the secondary sentence 327 at a process start location of the target secondary module 32 (S1504). The process start location according to the present embodiment is the top of the secondary module 32.

The processing means 22 adds the hierarchical structure 323 for the obtained secondary sentence 327 (S1506). More specifically, the processing means 22 according to the present embodiment outputs each of the branch hierarchy 324 and the hierarchy depth 325, which are previously described, into a row and column that corresponds to the hierarchical structure 323 of the line 320 in the worksheet (i.e. target worksheet) in which the target secondary module 32 is recorded.

Then, the processing means 22 determines whether the secondary sentence 327 at a process end location is already processed (S1508). The process end location according to the present embodiment is the end of the secondary module 32. If already processed (YES at S1508), the processing means 22 writes the processed secondary module 32 into the storage device 30' (S1510) and ends its process. On the other hand, if not yet processed (NO at S1508), the processing means 22 gets the secondary sentence 327 to be processed next, or the secondary sentence 327 of the next line 320 (S1512), and adds the hierarchical structure 323 for the obtained secondary sentence 327 (S1506).

As explained above, the processing means 22 stores the secondary module 32 into the storage device 30', wherein the secondary module 32 includes the secondary sentence 327 to which the hierarchical structure 323 is added. As can be seen from the above explanation, the function of the processing means 22 can be included in the conversion means 21. In this case, the apparatus 10' does not need to comprise the processing means 22.

The comparing means 23' according to the present embodiment has functions similar to those of the comparing means 23 according to the first embodiment. Hereafter, explanation is made mainly about the function different from that of the comparing means 23 by using FIG. 16 while referring to examples shown in FIG. 17.

When the comparing means 23' is activated similar to the comparing means 23, the comparing means 23' gets a first module name to identify a first module 32 of the secondary modules 32 and a second module name to identify a second module 32 of the secondary modules 32 (S1600). For example, the first module 32 is the secondary module 32 into which the modules 31 of a predetermined program before maintenance are combined, and the second module 32 is the secondary module 32 into which the modules 31 of the predetermined program after maintenance are combined.

Then, the comparing means 23' reads the first module 32 and the second module 32 that are identified by the obtained first module name and the second module name, respectively, from the storage device 30 (S1602 and S1604).

As shown in the example in FIG. 12 (see the part enclosed by dashed line A) and the example of the upper part in FIG. 17, EVALUATE-statement having five WHEN-phrases are written in XXX-module before maintenance. As a result, the first module 32 before maintenance includes four If-statements generated from this EVALUATE-statement (see the upper part in FIG. 17).

As can be seen from FIG. 17, fifth WHEN-phrase of five WHEN-phrases of XXX-module before maintenance is deleted by the maintenance. As a result, the second module 32 after maintenance includes three If-statements generated from this EVALUATE-statement (see the lower part in FIG. 17).

Figure 16:
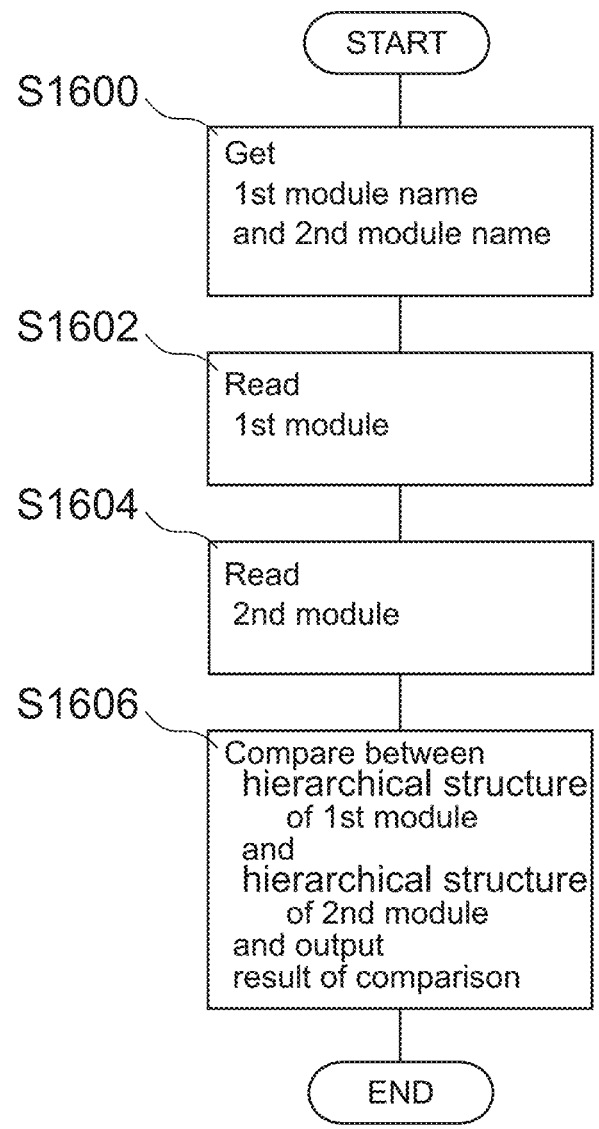
FIG. 16 is a flowchart showing functions of a comparing means of the apparatus of FIG. 10.

As shown in FIG. 16, the comparing means 23' compares between the hierarchical structure 323 of the first module 32 and the second hierarchical structure 323 of the second module 32 (S1606) after reading the first module 32 and the second module 32. According to the present embodiment, the comparing means 23' sequentially compares the hierarchy depths 325 of the first module 32 with the hierarchy depths 325 of the second module 32 from the first line and determines whether the fluctuations of the hierarchy depths 325 are identical to each other or not.

Referring to the examples of the first module 32 and the second module 32 shown in FIG. 17, the hierarchy depths 325 of the second module 32 are identical to the hierarchy depths 325 of the first module 32, respectively, until the line 320 with the line number 322 of "60". However, the hierarchy depth 325 ("1.2.1.1") of the line 320 with the line number 322 of "61" of the second module 32 is different from the hierarchy depth 325 ("1.2.1.1.1") of the line 320 with the line number 322 of "61" of the first module 32. Accordingly, the comparing means 23' creates a message which shows that the hierarchical structure 323 of the first module 32 is not identical to the hierarchical structure 323 of the second module 32. Thus, the comparing means 23' creates the message, or the result of the comparison between the hierarchical structure 323 of the first module 32 and the hierarchical structure 323 of the second module 32, similar to the comparing means 23. The comparing means 23' according to the present embodiment outputs the created message to the output device 50.

As can be seen from the above explanation, the comparing means 23' according to the present embodiment can compare between the hierarchical structures of the two modules (the first module 32 and the second module 32) similar to the comparing means 23 according to the first embodiment. Moreover, according to the present embodiment, in each of the first module 32 and the second module 32, a plurality of the related modules 31 are combined in the processing order. Accordingly, the whole programs before and after maintenance can be compared at a time.

For example, in a case where a module is maintained in association with an update of a software such as runtime system, the hierarchical structure of the module is basically not changed. Moreover, in such conversion, a conversion tool is sometimes used to maintain the module. However, in general, a conversion tool cannot completely correctly maintain a module. Even in such a case, it is possible to know whether the maintenance is correctly carried out or not by comparing the hierarchical structures of the first module 32 and the second module 32 which are generated from the modules before and after the maintenance, respectively.

The comparing method of the hierarchical structures in the present embodiment can be variously modified similar to the first embodiment. For example, the output device 50 can output the parts at which the hierarchical structure 323 of the first module 32 and the hierarchical structure 323 of the second module 32 are not identical to each other, so that the incorrectly maintained parts can be easily recognized.

Third Embodiment

Figure 18:
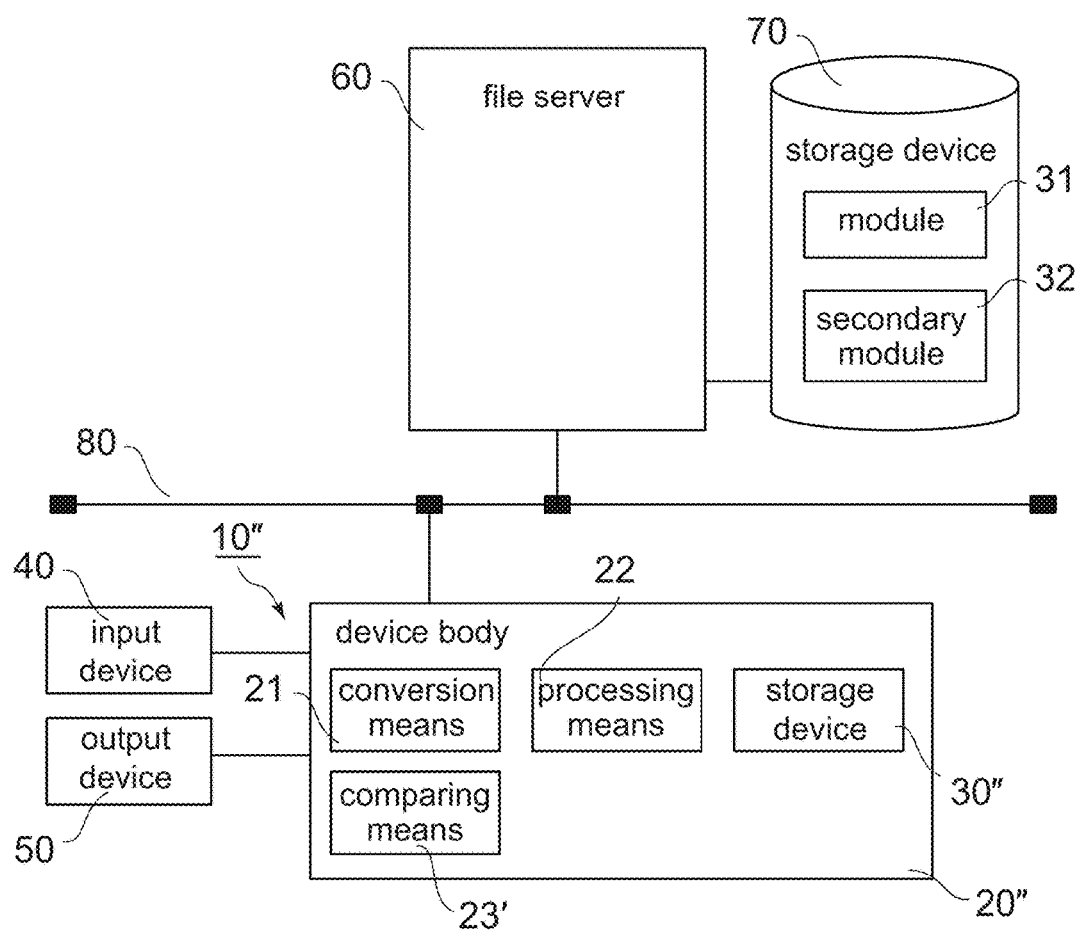
FIG. 18 is a system diagram showing a comparing apparatus (apparatus) according to a third embodiment of the present invention.

As shown in FIG. 18, a comparing apparatus (apparatus) 10" according to a third embodiment of the present invention comprises a device body 20", a storage device (storage means) 30", the input device 40 and the output device 50. The storage device 30" according to the present embodiment is a primary storage device of the device body 20". Similar to the device body 20' according to the second embodiment, the device body 20" comprises the conversion means 21, the processing means 22 and the comparing means 23'.

The apparatus 10" is communicatively coupled to a file server 60 via a communication line 80. The communication line 80, for example, may be a local area network (LAN) or may be the Internet. The file server 60 may comprise at least one of the conversion means 21, the processing means 22 and the comparing means 23'. Moreover, the file server 60 comprises a storage device (storage means) 70. The storage device 70 can store the modules 31 and the secondary modules 32. The apparatus 10" therefore can read the module 31, etc. from the storage device 70 and can write the module 31, etc. into the storage device 70.

As can be seen easily, according to the present embodiment, two modules (the first module 32 and the second module 32) among the secondary modules 32 can be compared with each other similar to the first and the second embodiments. Moreover, the result of the comparison can be shared by a plurality of the apparatus 10".

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST

10, 10', 10" comparing apparatus (apparatus)
20, 20', 20" device body
21 conversion means
22 processing means
23, 23' comparing means
30, 30', 30" storage device (storage means)
31 module (source program)
310 line
311 sequence number (line ID)
312 sentence
32 secondary module (module)
320 secondary line (line)
321 module ID
322 line number
323 hierarchical structure
324 branch hierarchy
325 hierarchy depth
326 sequence number (line ID)
327 secondary sentence
36, 36a hierarchical structure
360, 360a line
361 sequence number (line ID)
362 hierarchy depth
363 hierarchy pattern 364 end line (sequence number)
40 input device
50 output device
60 file server
70 storage device (storage means)
80 communication line

The invention claimed is:

1. A method for comparing two modules, the method being performed by a computer system which includes a storage device that stores the modules, wherein each of the modules includes a plurality of sentences written in a programming language, wherein the plurality of sentences of the module includes a plurality of conditional statements, wherein each of the plurality of conditional statements has at least one of an executable-on-satisfaction statement and an executable-on-failure statement, wherein the executable-on-satisfaction statement is one of the plurality of sentences that is executed when a conditional expression of the corresponding conditional statement is satisfied, and the executable-on-failure statement is another one of the plurality of sentences that is executed when the conditional expression is not satisfied, wherein at least one of the plurality of conditional statements has another one of the plurality of conditional statements therein as at least one of the executable-on-satisfaction statement and the executable-on-failure statement so that the plurality of conditional statements form a specifiable hierarchical structure of the module, the method comprising:

obtaining a first module and a second module from the storage device, wherein the first module is one of the two modules, and the second module is another one of the two modules; and creating a message which shows whether the hierarchical structure of the first module is identical to the hierarchical structure of the second module or not;

wherein the hierarchical structure of each module is a combination of hierarchy depths involved in the module, wherein each hierarchy depth indicates a depth with respect to a sentence at a top of the module.

2. An apparatus for comparing two modules each including a plurality of sentences written in a programming language, wherein the plurality of sentences of the modules include a plurality of conditional statements, wherein each of the plurality of conditional statements has at least one of an executable-on-satisfaction statement and an executable-on-failure statement, wherein the executable-on-satisfaction statement is one of the plurality of sentences that is executed when a conditional expression of the corresponding conditional statement is satisfied, and the executable-on-failure statement is another one of the plurality of sentences that is executed when the conditional expression is not satisfied, wherein at least one of the plurality of conditional statements has another one of the plurality of conditional statements therein as at least one of the executable-on-satisfaction statement and as the executable-on-failure statement so that the plurality of conditional statements form a hierarchization of the plurality of sentences, and wherein the hierarchization of the sentences forms a specifiable hierarchical structure of the module; the apparatus comprising:

a storage device; and
a CPU which is configured to operate as a comparing device;
wherein the storage device stores two or more of the modules;
wherein the comparing device obtains a first module and a second module, from the storage device, among the modules stored in the storage device, and creates a message which shows whether the hierarchical structure of the first module is identical to the hierarchical structure of the second module or not; and
wherein the hierarchical structure of each module is a combination of hierarchy depths involved in the module, wherein each hierarchy depth indicates a depth with respect to a sentence at a top of the module.

3. The apparatus as recited in claim 2, wherein at least one of the first module and the second module is a combination of a plurality of modules.

4. The apparatus as recited in claim 2, wherein:
the apparatus further comprises an output device; and
the comparing device outputs the message to the output device.

5. A non-transitory computer-readable storage medium having stored thereon a program for comparing two modules on a computer system which includes a storage device that stores the modules, wherein each of the modules includes a plurality of sentences written in a programming language, wherein the plurality of sentences of the module includes a plurality of conditional statements, wherein each of the plurality of conditional statements has at least one of an executable-on-satisfaction statement and an executable-on-failure statement, wherein the executable-on-satisfaction statement is one of the plurality of sentences that is executed when a conditional expression of the corresponding conditional statement is satisfied, and the executable-on-failure statement is another one of the plurality of sentences that is executed when the conditional expression is not satisfied, wherein at least one of the plurality of conditional statements has another one of the plurality of conditional statements therein as at least one of the executable-on-satisfaction statement and the executable-on-failure statement so that the plurality of conditional statements form a specifiable hierarchical structure of the module, the program being executable by a processor of the computer system to perform functions comprising:

obtaining a first module and a second module from the storage device, wherein the first module is one of the two modules, and the second module is another one of the two modules; and creating a message which shows whether the hierarchical structure of the first module is identical to the hierarchical structure of the second module or not;

wherein the hierarchical structure of each module is a combination of hierarchy depths involved in the module, wherein each hierarchy depth indicates a depth with respect to a sentence at a top of the module.

* * * * *